United States Patent
Hashimoto

(10) Patent No.: US 7,436,784 B2
(45) Date of Patent: Oct. 14, 2008

(54) RESILIENT PACKET RING NETWORK FOR REALIZING MAC BRIDGING

(75) Inventor: Masanori Hashimoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 773 days.

(21) Appl. No.: 10/773,769

(22) Filed: Feb. 6, 2004

(65) Prior Publication Data
US 2004/0170184 A1 Sep. 2, 2004

(30) Foreign Application Priority Data
Feb. 7, 2003 (JP) ............................. 2003-031398

(51) Int. Cl.
*H04L 12/28* (2006.01)
*G06F 15/16* (2006.01)
(52) U.S. Cl. .................. 370/258; 370/403; 709/251
(58) Field of Classification Search ................ 370/258, 370/400–405, 389, 392, 465, 466, 470–471, 370/474, 428; 709/238, 249, 251
See application file for complete search history.

(56) References Cited

U.S. PATENT DOCUMENTS

| 4,577,313 | A | * | 3/1986 | Sy ............................. 370/403 |
| 5,349,583 | A | * | 9/1994 | Christensen et al. ......... 370/434 |
| 5,504,747 | A | * | 4/1996 | Sweazey ...................... 370/403 |
| 6,314,110 | B1 | | 11/2001 | Chin et al. |
| 6,631,137 | B1 | * | 10/2003 | Lorrain et al. ............... 370/401 |
| 2003/0074469 | A1 | * | 4/2003 | Busi et al. .................... 709/238 |
| 2003/0154315 | A1 | * | 8/2003 | Sultan et al. ................. 709/251 |

OTHER PUBLICATIONS

Marc Holness et al. Bridging Ad-Hoc (BAH) Overview. May 2002 pp. 1-12.
Marc Holness. Bridging on 802.17 LAN with 802.1D/Q Compliance. May 2002 pp. 1-22.
Li Mo et al. Enhanced Bridging Spatial Reuse of 802.17 Bridge Traffic. Jul. 2002 Slide 1-14.
Marc Holness et al. 802.17 Frame Structure and Bridging Ad-Hoc Support. May 2002 Slide 1-24.
Anoop Ghanwani Lantern et al. Flooding in 802.17 Networks. May 2002 pp. 1-22.
Li Mo et al. 802.1D/Q Compliance and Spatial Reuse. May 2002 Slide 1-35.
Marc Holness. Basic Bridging Compliance. Jul. 2002 pp. 1-11.
BAH 802.17 Frame Structure Requirements. Jul. 2002 Slide 1-19.
BAH Summary pp. 1-4, May 2002.
David V. James et al. 802.17 Presentations, Mar. 2002 pp. 1-15.

(Continued)

*Primary Examiner*—Hong Sol Cho
(74) *Attorney, Agent, or Firm*—Katten Muchin Rosenman LLP

(57) ABSTRACT

A bridge node converts a MAC frame addressed to a station node into a RPR MAC frame and thus transmits it, and encapsulates a MAC frame addressed a station being located the outside of a ring and connected to other bridge node into the RPR MAC frame, and transmits it. The bridge node thereby receives a RPR MAC frame into which the MAC frame is encapsulated, and the station node receives the RPR MAC frame that the MAC frame is not encapsulated.

22 Claims, 34 Drawing Sheets

OTHER PUBLICATIONS

Marc Holness, et al. Bridging Ad-Hoc (BAH) Overview Jul. 2002 pp. 1-6.
802.17 Bridging Compliance Roadmap Jul. 2002 pp. 1-8.
802.1D and 802.1Q Bridging Conformance Oct. 2001 pp. 1-7.
Resilient Packet Ring Annex F Jul. 2002 pp. 283-308.
802.1D and 802.1Q Bridging Conformance Annex F Jun. 2002 pp. 90-106.
Resilient Packet Ring Jun. 2002 pp. 107-124.
Resilient Packet Ring. Medium Access Control (MAC) Parameters, Physical Layer Interface and Management Parameters. Aug. 12, 2002, pp. 1-154.

* cited by examiner

FIG. 4

| DEVICE NAME | TYPE | IP ADDRESS | MAC ADDRESS | DEVICE NAME | TYPE | IP ADDRESS | MAC ADDRESS |
| --- | --- | --- | --- | --- | --- | --- | --- |
| RA | ROUTER (RPR NODE) | 10.1.0.1 | MRA | S1 | STATION | 10.1.0.10 | MS1 |
| RB | ROUTER (RPR NODE) | 10.1.0.2 | MRB | S2 | STATION | 10.1.0.11 | MS2 |
| BC | BRIDGE (RPR NODE) | — | MBC | S3 | STATION | 10.1.0.12 | MS3 |
| BD | BRIDGE (RPR NODE) | — | MBD | S4 | STATION | 10.1.0.13 | MS4 |
| RE | ROUTER (RPR NODE) | 10.1.0.3 | MRE | S5 | STATION | 10.1.0.14 | MS5 |
| BF | BRIDGE (RPR NODE) | — | MBF | S6 | STATION | 10.1.0.15 | MS6 |

| NODE NAME | MAC ADDRESS | OUTER TTL | OUTER STATUS | INNER TTL | INNER STATUS |
|---|---|---|---|---|---|
| RA | MRA | — | — | — | — |
| RB | MRB | 1 | IDLE | 5 | IDLE |
| RG | MBC | 2 | IDLE | 4 | IDLE |
| BD | MBD | 3 | IDLE | 3 | IDLE |
| RE | MRE | 4 | IDLE | 2 | IDLE |
| BF | MBF | 5 | IDLE | 1 | IDLE |

| NODE NAME | MAC ADDRESS | OUTER TTL | OUTER STATUS | INNER TTL | INNER STATUS |
|---|---|---|---|---|---|
| RB | MRB | — | — | — | — |
| BC | MBC | 1 | IDLE | 5 | IDLE |
| BD | MBD | 2 | IDLE | 4 | IDLE |
| RE | MRE | 3 | IDLE | 3 | IDLE |
| BF | MBF | 4 | IDLE | 2 | IDLE |
| RA | MRA | 5 | IDLE | 1 | IDLE |

| NODE NAME | MAC ADDRESS | OUTER TTL | OUTER STATUS | INNER TTL | INNER STATUS |
|---|---|---|---|---|---|
| BC | MBC | — | — | — | — |
| BD | MBD | 1 | IDLE | 5 | IDLE |
| RE | MRE | 2 | IDLE | 4 | IDLE |
| BF | MBF | 3 | IDLE | 3 | IDLE |
| RA | MRA | 4 | IDLE | 2 | IDLE |
| RB | MRB | 5 | IDLE | 1 | IDLE |

| NODE NAME | MAC ADDRESS | OUTER TTL | OUTER STATUS | INNER TTL | INNER STATUS |
|---|---|---|---|---|---|
| BD | MBD | — | — | — | — |
| RE | MRE | 1 | IDLE | 5 | IDLE |
| BF | MBF | 2 | IDLE | 4 | IDLE |
| RA | MRA | 3 | IDLE | 3 | IDLE |
| RB | MRB | 4 | IDLE | 2 | IDLE |
| BC | MBC | 5 | IDLE | 1 | IDLE |

| NODE NAME | MAC ADDRESS | OUTER TTL | OUTER STATUS | INNER TTL | INNER STATUS |
|---|---|---|---|---|---|
| RE | MRE | — | — | — | — |
| BF | MBF | 1 | IDLE | 5 | IDLE |
| RA | MRA | 2 | IDLE | 4 | IDLE |
| RB | MRB | 3 | IDLE | 3 | IDLE |
| BC | MBC | 4 | IDLE | 2 | IDLE |
| BD | MBD | 5 | IDLE | 1 | IDLE |

| NODE NAME | MAC ADDRESS | OUTER TTL | OUTER STATUS | INNER TTL | INNER STATUS |
|---|---|---|---|---|---|
| BF | MBF | — | — | — | — |
| RA | MRA | 1 | IDLE | 5 | IDLE |
| RB | MRB | 2 | IDLE | 4 | IDLE |
| BC | MBC | 3 | IDLE | 3 | IDLE |
| BD | MBD | 4 | IDLE | 2 | IDLE |
| RE | MRE | 5 | IDLE | 1 | IDLE |

FIG. 6A

| DA=BC |
|---|
| SA=MS1 |
| PT=0x0806 |
| ARP HEADER (ARP REQUEST) |
| SA=MS1 |
| SIP=10.1.0.10 |
| DA=NULL |
| DIP=10.1.0.15 |
| FCS |

ORIGINAL ARP PACKET TO BE TRANSMITTED BY S1

FIG. 6B

| RPR HEADER |
|---|
| DA=BC |
| SA=MS1 |
| PT=0x0806 |
| HEC |
| ARP HEADER (ARP REQUEST) |
| SA=MS1 |
| SIP=10.1.0.10 |
| DA=NULL |
| DIP=10.1.0.15 |
| FCS |

RPR-ENCAPSULATED ARP PACKET TO BE TRANSMITTED BY BC

FIG. 6C

| DA=MS1 |
|---|
| SA=MS6 |
| PT=0x0806 |
| ARP HEADER (ARP RESPONSE) |
| SA=MS6 |
| SIP=10.1.0.15 |
| DA=MS1 |
| DIP=10.1.0.10 |
| FCS |

ARP RESPONSE PACKET TO BE TRANSMITTED BY S6

FIG. 6D

| RPR HEADER |
|---|
| DA=MC |
| SA=MBF |
| PT=0x0806 |
| HEC |
| DA=MS1 |
| SA=MS6 |
| PT=0x0806 |
| ARP HEADER (ARP RESPONSE) |
| SA=MS6 |
| SIP=10.1.0.15 |
| DA=MS1 |
| DIP=10.1.0.10 |
| FCS |

ENCAPSUALTED ARP RESPONSE PACKET TO BE TRANSMITTED BY BF

IP DATA PACKET
TO BE TRANSMITTED
BY S1

ENCAPSUALTED IP
DATA PACKET TO
BE TRANSMITTED
BY BC

FIG. 8A

| RPR HEADER |
|---|
| DA=BC |
| SA=MRA |
| PT=0x0806 |
| HEC |
| ARP HEADER (ARP REQUEST) |
| SA=MRA |
| SIP=10.1.0.1 |
| DA=NULL |
| DIP=10.1.0.12 |
| FCS |

ARP PACKET TO BE TRANSMITTED BY RA

FIG. 8B

| DA=BC |
|---|
| SA=MRA |
| PT=0x0806 |
| ARP HEADER (ARP REQUEST) |
| SA=MRA |
| SIP=10.1.0.1 |
| DA=NULL |
| DIP=10.1.0.12 |
| FCS |

ARP REQUEST PACKET TO BE TRANSMITTED BY BD

FIG. 8C

| DA=MRA |
|---|
| SA=MS3 |
| PT=0x0806 |
| ARP HEADER (ARP RESPONSE) |
| SA=MS3 |
| SIP=10.1.0.12 |
| DA=MRA |
| DIP=10.1.0.1 |
| FCS |

ARP RESPONSE PACKET TO BE TRANSMITTED BY S3

FIG. 8D

| RPR HEADER |
|---|
| DA=MRA |
| SA=MS3 |
| PT=0x0806 |
| HEC |
| ARP HEADER (ARP RESPONSE) |
| SA=MS3 |
| SIP=10.1.0.12 |
| DA=MRA |
| DIP=10.1.0.1 |
| FCS |

ARP RESPONSE PACKET TO BE TRANSMITTED BY BD

FIG. 9A

| RPR HEADER |
|---|
| DA=MBD |
| SA=MRA |
| PT=0x0800 |
| HEC |
| DA=MS3 |
| SA=MRA |
| PT=0x0800 |
| IP HEAD |
| IDA=10.1.0.12 |
| ISA=10.1.0.1 |
| PAYLOAD |
| FCS |

IP DATA PACKET
TO BE TRANSMITTED
BY RA

FIG. 9B

| DA=MRA |
|---|
| SA=MS3 |
| PT=0x0800 |
| IP HEAD |
| IDA=10.1.0.1 |
| ISA=10.1.0.12 |
| PAYLOAD |
| FCS |

IP DATA PACKET
TO BE TRANSMITTED
BY S3

FIG. 9C

| RPR HEADER |
|---|
| DA=MRA |
| SA=MS3 |
| PT=0x0800 |
| HEC |
| IP HEAD |
| IDA=10.1.0.1 |
| ISA=10.1.0.12 |
| PAYLOAD |
| FCS |

IP DATA PACKET
TO BE TRASLATED
AND TRANSMITTED
BY BD

FIG. 12

| DEVICE NAME | MAC ADDRESS | DEVICE NAME | MAC ADDRESS | PORT NUMBER |
|---|---|---|---|---|
| RA | MRA | — | — | 0 (RPR) |
| RB | MRB | — | — | 0 (RPR) |
| BC | MBC | S1 | MS1 | 1 (ETHERNET) |
| | | S2 | MS2 | 2 (GETHERNET) |
| BD | MBD | S3 | MS3 | 0 (RPR) |
| | | S4 | MS4 | 0 (RPR) |
| RE | MRE | — | — | 0 (RPR) |
| BF | MBF | S5 | MS5 | 0 (RPR) |
| | | S6 | MS6 | 0 (RPR) |

FIG. 17B

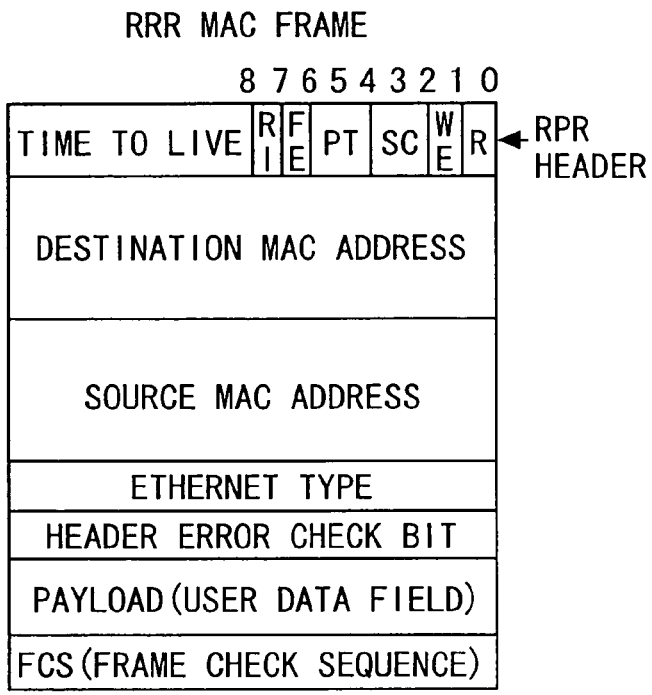

RRR MAC FRAME

```
NOTE: MEANINGS OF RESPECTIVE FIELDS OF RPR HEADER,
 TTL: INDICATING TIME-TO-LIVE OF FRAME. ONE IS SUBTRACT
     FROM TTL VALUE (-1) FOR EVERY 1-NODE PASSAGE
     (DEFINITION OF NODE WILL BE GIVEN IN NEXT ITEM),
     WHEN RESULT OF DECREASE (-1) BECOMES 0, FRAME
     IS NOT FORRWARDED TO NEXT NODE.
 RI: ID OF RINGLET. RINGLET IS USED WHEN INDICATING ONE
     OF BIDIRECTIONAL RINGS, AND THIS BIT INDICATES
     WHICH RINGLET THIS FRAME ORIGINALLY EXISTS.
     RINGLET 0 = 0, RINGLET 1 = 1.
 FE: FE INDICATES WHETHER THIS PACKET IS FAIRNESS
     CONTROL OBJECT OR NOT. FE = 0, THIS IS NOT FAIRNESS
     OBJECT, FE = 1, THIS IS FAIRNESS OBJECT.
 PT: PT DEFINES PACKET ATTRIBUTE. 00 = PROSPECTIVE
     RESERVATION, 01 = RPR CONTROL PACKET, 10 = RPR FAIRNESS
     PACKET, FE = 1, THIS IS FAIRNESS OBJECT.
 SC: SERVICE CLASS. , 00 = CLASS C, 01 = CLASS B,
     10 = CLASS A (SUBCLASS A1), 11 = CLASS A (SUBCLASS
     A0, WE: LAPPING FUNCTION PROVIDED OR NON-PROVIDED 0 =
     NO LAPPING FUNCTION, 1 = LAPPING FUNCTION PROVIDED.
 R: PROPSECTIVE RESERVATION
```

FIG. 20

PRIOR ART

| NODE NAME | MAC ADDRESS | OUTER | | INNER | |
|---|---|---|---|---|---|
| | | TTL | STATUS | TTL | STATUS |
| SA | MSA | — | — | — | — |
| SB | MSB | 1 | IDLE | 11 | IDLE |
| SC | MSC | 2 | IDLE | 10 | IDLE |
| SD | MSD | 3 | IDLE | 9 | IDLE |
| SE | MSE | 4 | IDLE | 8 | IDLE |
| SF | MSF | 5 | IDLE | 7 | IDLE |
| SG | MSG | 6 | IDLE | 6 | IDLE |
| SH | MSH | 7 | IDLE | 5 | IDLE |
| SI | MSI | 8 | IDLE | 4 | IDLE |
| SJ | MSJ | 9 | IDLE | 3 | IDLE |
| SK | MSK | 10 | IDLE | 2 | IDLE |
| SL | MSL | 11 | IDLE | 1 | IDLE |

FIG. 21

PRIOR ART

| NODE NAME | MAC ADDRESS | OUTER | | INNER | |
|---|---|---|---|---|---|
| | | TTL | STATUS | TTL | STATUS |
| SA | MSA | — | — | — | — |
| SB | MSB | 1 | IDLE | 11 | IDLE |
| SC | MSC | 2 | IDLE | 10 | IDLE |
| SD | MSD | 3 | IDLE→BUSY | 9 | IDLE |
| SE | MSE | 4 | IDLE→BUSY | 8 | IDLE |
| SF | MSF | 5 | IDLE→BUSY | 7 | IDLE |
| SG | MSG | 6 | IDLE→BUSY | 6 | IDLE |
| SH | MSH | 7 | IDLE→BUSY | 5 | IDLE |
| SI | MSI | 8 | IDLE→BUSY | 4 | IDLE |
| SJ | MSJ | 9 | IDLE→BUSY | 3 | IDLE |
| SK | MSK | 10 | IDLE→BUSY | 2 | IDLE |
| SL | MSL | 11 | IDLE→BUSY | 1 | IDLE |

RESILIENT PACKET RING NETWORK FOR REALIZING MAC BRIDGING

BACKGROUND OF THE INVENTION

The invention relates to a ring network, and particularly to a system and an implementation technology for actualizing MAC (media access control) bridging on RPR (Resilient Packet Ring) protocol mainly defined by IEEE802.17.

The RPR is a network protocol technology mainly aiming at being provided a network for connecting between cities, such as MAN/WAN (Metropolitan Area Network/Wide Area Network). An examination of the RPR is underway in order to establish a draft at the IEEE802.17 Committee. As of September in 2002, Draft version 1.0 (tentative specifications) as first standard specifications were released, at which stage they were approved at the meeting at the end of September, and the final specifications are scheduled to be determined in March in 2003 through necessary modifications thereafter. The RPR is based on SRP (Spatial Reuse Protocol) released by Cisco Corp. and has the following features.
1. The RPR supports a bidirectional dual ring network.
2. The RPR supports a MAC layer in layer 2.
3. An effective utility rate of a using bandwidth is high.
4. The RPR supports Plug & Play.
5. A protection switching time is sub-50 ms.

Note that the SRP is described in, for instance, a Patent document 1.

The following points in addition to the above-mentioned are characteristic of the RPR.
1. There are three priority classes, and it is easy to implement QoS (Quality of Service) control on the high-order layer.
2. A protection switching system is a steering protection (which is a system for switching a route having a failure to another route of a reversed direction along the ring, and a wrapping protection (which is a system for turning the route having a failure back in the reversed direction along the ring just anterior to a failure point) is an option.
3. The RPR is a system that is limited to the MAC layer in the regulations and does not depend on the lowest-order layer (the physical layer).

The RPR is a novel MAC layer protocol and terminates the MAC frame. Accordingly, a basic idea has hitherto been such that a device (a RPR device) implementing the protocol should be a device (which is router, gateway, and the like) executing a layer process higher than this. At the recent IEEE meetings, however, an examination for defining a forwarding method so that the RPR device can function as a device (which is a so-called bridge) capable of transparently forwarding the MAC frame, is underway.

With respect to the forwarding method, a good deal of problems and methods for solutions thereof are presented, and finally a forwarding method based on IEEE802.1D was proposed. The proposed method also, however, has a problem, and, in the present, standards of the forwarding method are not yet taken shape.

For describing the technology according to the invention of the present application, the following terms will at first be defined.

(1) MAC frame: the "MAC frame" is a frame having a MAC header. Herein, this indicates a frame of the Ethernet (registered trademark) defined in IEEE802.3 and a frame having a RPR MAC header defined in IEEE802.17. Especially in the case of distinguishing therebetween, there are called an "EMAC frame" and a "RMAC frame", respectively. FIG. 17 shows formats of the EMAC frame and the RMAC frame.

(2) Node: the "node" is a device for actualizing the RPR protocol. Each node exists on bidirectional dual rings (two counter-rotating ringlets). In the specification, the node might be called a "RPR node" and also called a "RPR device".

(3) Station: the "station" is a device that terminates the MAC frame. The station receives the MAC frame and transfers a data field thereof to a high-order layer. Further, the station assembles the MAC frame including data from the high-order layer and transmits it. When the station receives the MAC frame, if the MAC frame has an error, or a destination MAC address (MAC DA) of the MAC frame is not coincident with a MAC address of the station itself, the MAC frame is basically discarded. In case a receipt frame is a RMAC frame, however, the RMAC frame is made to pass through on the side opposite to the side of having received it. In a case where a node (a RPR node) that performs processing of the RPR protocol has functions as the station, the node is called a "station node".

(4) Bridge: the "bridge" is a device that forwards the MAC frame as far as any error does not occur. Normally, the bridge copies and distributes the MAC frame received at one of physical ports to all other physical ports. Further, the bridge has a MAC address learning function, and creates and keeps a table (called "a port-to-MAC address mapping table" or "MAC learn table") from MAC DA/SA (source address) of MAC frames to be forwarded, The table shows a physical port to which a device indicated by the source/destination addresses of the MAC frame is connected. The bridge checks MAC DA/SA of each received MAC frame. If the MAC SA is not registered in the table, the bridge registers the MAC SA with an identifier of a physical port (e.g., port number) received the MAC frame to the table. Further, if the MAC DA is already registered in the table, the bridge forwards the MAC frame to only a physical port corresponding to the MAC DA by referring the table. An extra load is thereby prevented from being applied to other ports. In a case where the node (the RPR node) performing the processing of the RPR protocol has the bridge function, this node is called a "bridge node".

Next, a method of transmitting and receiving the RMAC frame between the stations, which is tentatively defined in IEEE802.17, will be at first explained as a prior art (see, for instance, Non-Patent document 1).

FIG. 18 shows one example of a RPR network. FIG. 18 shows a plurality of nodes SA-SL as station nodes each having the station function. The nodes SA-SL are sequentially connected in a ring-shape in a state (sequence) illustrated in FIG. 18 via bidirectional communication lines (two counter-rotating ringlets). Normally, an optical fiber is used as communication line. Herein, for the sake of explanation, the RPR network is defined as follows.

<1> MAC addresses of the respective nodes are:

SA: MSA, SB: MSB, . . . SL: MSL

<2> Clockwise connecting sequence (outer ringlet) is:

SA→SB→SC . . . SL→SA

<3> Counterclockwise connecting sequence (inner) is:

SA→SL→SK . . . SB→SA

In the RPR, it is defined that a node, when receives a MAC frame, performs processes as below.

(A) An error check is conducted based on FCS/HEC of the MAC frame, and, if there is an error, the MAC frame is discarded.

(B) In case there is no errors, the MAC DA of the MAC frame is checked, if the MAC DA is coincident with a MAC address of the node itself, the MAC frame is captured inside, and a data field thereof is transferred onto the high-order layer.

(C) When the MAC address is not the MAC address of the node itself, the MAC SA is checked. If the MAC SA is coincident with the node's MAC address, the MAC frame is discarded.

(D) In case it is not coincident, a value of TTL (Time to Live) of the MAC frame is checked. If the TTL value is under 1 (not TTL=1), the MAC frame is discarded.

(E) When the TTL value is 1 or more (TTL=1 is established), one (1) is subtracted from the present TTL value, and the MAC frame is reassembled (concretely, the HEC and FCS are recalculated) and transmitted to a next neighboring node (which is called "pass").

Accordingly, the node SA shown in FIG. 18, in the case of transmitting a frame to the node SD, assembles a RMAC frame as shown in FIG. 19.

Normally, each node (the node SA) transmits the frame onto a ringlet of a direction (which is called "near (short) direction") that the number of nodes forwarding the frame is small. Therefore, the node SA transmits the frame to the outer ringlet.

The frame reaches at first the node SB. The node SB, as the MAC DA of the frame is not coincident with the MAC address of the node SB itself, lets the frame pass through (to be concrete, transmits the frame to the neighboring node SC corresponding to the next node). At this time, one is subtracted from the TTL value of the frame. The node SC executes the same process as the node SB does, and the frame arrives at the node SD. The node SD, as the MAC DA of the frame is coincident with the MAC address of the node SD, captures the frame inside the node SD, and transfers the data field of the frame onto the high-order layer, thus completing the process.

For executing the process described above, each node is required to specifically grasp the number of forwarding nodes, each of which exists between a source node (node itself) and the destination node, with respect to each direction of ringlet (outer and inner ringlets). In the RPR protocol, for achieving the object, a control packet that is called a topology discovery packet for grasping a topology of the ring (each ringlet), is transferred and received between the RPR nodes. The topology discovery packet includes the MAC addresses, as pieces of information, of the source node itself and the neighboring nodes thereof. Each of the nodes receiving the topology discovery packet adds a piece of self-information (a MAC address of the node itself) and sends it to the neighboring node. These processes are executed each node. Eventually all the nodes are thereby able to know the MAC addresses of all other nodes and the number of the forwarding nodes (which is precisely a value of TTL needed for the frame transmission). Each node retains them as a topology map table. By way of an example, FIG. 20 (Table 1) shows the topology map table retained on the node SA illustrated in FIG. 18. Note that the topology discovery packet is, when in an initial setting in addition to when adding and deleting the nodes, periodically transmitted and received between the respective nodes, whereby updated information of the network can be kept at all times.

Further, in case of failures occurred in the node or on the communication line between the nodes, each node, when detects the failures, sends a control packet called a protection packet to all other nodes. Each of the nodes is thereby notified of a change of the topology. The change of the topology is immediately reflected in the topology map table. By way of an example, FIG. 21 (Table 2) shows a change of the topology map table when a failure occurred on the communication line for transmitting the frame the node SD from the node SC to the node SD illustrated in FIG. 18. Thus, a state of the topology is reflected in the topology map table. Thereby, it is indicated that the node SA cannot perform communications, about each node further than the node SD, by using the outer route. Therefore, the node SA can actually judge that using the inner route to perform communications to each node further than the node SD. Such a technology is called steering and is one of the principal technologies of the RPR.

Now, in the case of applying the RPR to a normal network, other than the nodes on the rings, a variety of networks such as the Ethernet, etc. are normally connected, and it is required that the communications between stations (off-the-ring stations), each of which is located in the outside of the rings and is accommodated to one of nodes (on-the-ring nodes) on the rings, be possible.

Originally, the RPR is based on an assumption that the frame is routed between the off-the-ring stations via the high-order layer. Namely, the MAC frame, which has been received by the node on the ring and comes from the off-the-ring station, is temporarily designated in its forwarding destination (other on-the-ring node) by the high-order layer and is then transmitted as a frame of a RPR MAC layer onto the ring. Then, the frame is received by a different node on the ring, then also designated in its forwarding destination (an off-the-ring station) by the high-order layer, and transmitted to a destination station after becoming a frame of an outside protocol. This forwarding procedure indicates that the node on the ring must invariably be a router. In the case of the same layer protocol as the RPR where the frame dealt with by the off-the-ring station is an Ethernet frame, etc., however, there is a large load in terms of a cost and a speed.

The IEEE802.17 Committee, for solving the above problem, assumes a MAC bridging system for giving a bridge function of forwarding the MAC frame with no intermediary of the high-order layer, and is going to incorporate a function of making the RPR node function as a bridge into the rules. At the present, a prospective rule on the occasion of actualizing the function may be a transparent bridge system, defined in IEEE802.1D, and the rules of IEEE802.17 will be settled in the direction (refer to, e.g., Non-Patent documents, 2, 3, 4, 5).

The transparent bridge system has, however, some problems that will be given as follows. The IEEE802.17 Committee also pointed out the problem, and, in the present situation, tangible standard rules of the bridge function are not yet seen.

A bridge device for executing MAC bridging, in the case of being installed as, for instance, a bridge node on the RPR network defined in IEEE802.17 as shown in FIG. 22, must be capable of the following communications (refer to, e.g., Non-Patent document 6).

1) SX-BJ-BD-SY communications (bidirectional)
2) SX-BJ-SA communications (bidirectional)
3) SA-SG communications (bidirectional, bridge pass)

For enabling all these communications, a transparent bridge system of IEEE802.1D was proposed at the IEEE802.17 Committee. In the case of applying the system directly to the node in the RPR network, the bridge node executes frame processing (a transparent translation) shown in FIG. 23.

In FIG. 23, the on-the-ring bridge node executing the framing processing learns information about which on-the-ring bridge a MAC address off the ring where the communications are performed is linked to, and sorts out it into a table. The communications 1) through 3) can be thereby performed. The transparent bridge system has, however, the following problems pointed out by the IEEE802.17 Committee (refer to, e.g., Non-Patent document 7).

A relationship between the MAC address of the bridge node and the MAC address of the off-the-ring device connected to the bridge node, remains unlearned. Therefore, in the bridge node through which the frame addressed to the off-the-ring device is passed, the frame is copied addressed to the network connected to the bridge nodes (which is called blooding), and there is a possibility of increasing the load on the network.

According to the RPR, normally in the case of transmitting the MAC frame from a certain node on the ring to a different unspecified node, in a ringlet selection, the smaller in TTL is to be selected. In a case where BJ-BD distances are equal in the network illustrated in FIG. 22, normally any one of the routes is predetermined. Herein, in the case of transmitting the frame on a route of SX→BJ→SA→BD→SY, the bridge nodes BL, BC existing in the middle of the route can learn from the passing frame that the station SX is connected to the bridge node BJ.

The bridge node, however, in the case of not yet learning that the station SY is connected to the bridge node BD, there being a possibility that station SY might be connected to the self-device (the bridge node itself), therefore copies the frame simultaneously when it passes through and transmits the frame to the off-the-ring network connected to the self-device. Moreover, the bridge nodes BF, BI through which the frame does not pass are unable to learn that the station SX is connected to the bridge node BJ.

Supposing that there is a response on the higher-layer than the station SY, the frame is transmitted to the station SX and transferred across a route of SY→BD→SG→BJ→SX (because if the respective stations take the same algorithm, the equal distance implies a selection of the same direction), in which case the bridge nodes BF, BI can learn that the station SY is connected to the bridge node BD. The bridge nodes BL, BC are, however, unable to learn. Further, the bridge nodes BF, BI do not yet learn that the station SX is connected to the bridge node BJ, and therefore send a copy of the frame to the network off the ring.

When the frame arrives finally at the station SX from the station SY, the communications between the stations SX-SY via the outer route (the above route) become possible. However, the intermediate bridge nodes BL, BC, BF and BI cannot ever learn the address of the frame passing through the nodes themselves, resulting in a constant occurrence of the blooding (see FIG. 24: for example, Non-Patent document 8, slides 11 and 12).

As a method of preventing the problem given above, there is a method of sending a response thereof in the frame-coming direction. For instance, the bridge node BJ starts transmitting round the outer ring to the station SY, and the bridge node BD also starts transmitting round the outer ring to the station SX. In the method, in a case where the respective stations SX, SY simultaneously transmit the frames to the destinations, the frames are passed round the outer ring and reach the destinations, while responses thereof are returned round via the inner ring to the destinations, and further responses thereof go round the outer ring and so on, resulting in an oscillating state where the destinations are floating. This induces a possibility in which the frame sequence might be reversed depending on a delay of frame transmission (refer to, e.g., Non-Patent document 8, slides 7 and 8).

Further, as shown in FIG. 22, the communications between the stations SZ-SY involve using in principle a shorter route. Accordingly, the bidirectional communications via a route of SZ-BL-SA-BD-SY, are performed. Herein, if the communication line to BL→SA is disconnected (cut off), the communications round the outer ring in a direction of SZ→SY cannot be carried out. Hence, the inner ring is used according to the steering. At this time, the respective bridge nodes BJ, BF, BI did not learn that the station SY is connected to the bridge BD. Accordingly, the flooding occurs. Besides, a response thereof is sent via a route of SY→BD→SA →BL→SZ round the inner ring as it used to be so far. This makes it impossible forever to learn f about the address mapping described just above (see FIG. 25: for instance, Non-Patent document 9, slides 11 and 12).

As a method of preventing the aforementioned problem, there is a method of transmitting the response in the frame-coming direction in the same way as in the first problem. If a longer route between the bridge nodes BD-BL is selected, however, there are a larger number of cross-over nodes than by selecting the shorter. Accordingly, more of the whole usable bands are used up as a result. In other words, the load on the network rises.

Thus, the transparent bridge system in the present situation has a possibility that an extra load increases in some cases.

<2> For the reason of a reliability, etc., the frame addressed to the device on the off-the-ring network connected to the plurality of bridge nodes has no information about where to go and might be lost.

As shown in FIG. 29, it is considered from a point of view of the reliability that the off-the-ting station SY is connected to the two bridge nodes BC, BD on the ring. At this time, the selection of the connection between the station SY and the bridge nodes BC, BD, is determined by applying Spanning Tree Protocol defined in IEEE802.1D. Supposing that a route between BC-SY is selected, for instance, the frame is transmitted and received between the SX-SY via the bridge node BC, and each of the on-the-ring nodes learns that the station SY is connected to the bridge node BC (FIG. 26: normal state).

Herein, if a failure occurs between BC-SY, the station SY selects a route between BD-SY in accordance with the Spanning Tree Protocol. The bridge node BC, however, simply judges that the communications with the station SY fall into a failure, and there is no method of knowing that the bridge node BD can surrogate. Hence, the frame sent addressed to the station SY is taken back by the bridge node BC, wherein the frame is judged to have the failure and discarded. Accordingly, all the frames from the station SX to the station SY do not reach in spite of an existence of the route of BD-SY (FIG. 27: failure state between BC-SY). This makes it meaningless to connect the station SY to both of the bridges BC and BD in order to enhance the reliability (refer to, e.g., Non-Patent document 8, slides 9 and 10).

As a plan for solving the problem, the IEEE802.17 Committee proposed that a flooding bit is provided in the RPR header. The processing is executed so that all the nodes on the ring can receive the frame in which the flooding bit is set irrespective of whatever destination it may have. FIG. 28 shows diagram of this concept. The plan enables the frame to reach the destination even in such a case as <2> by creating a method of flooding the frame to all the node at all times. Further, all of the node can always learn the same content. Accordingly, any problem as in <1> does not arise.

The use of the communication bands of almost all the nodes for a certain frame, however, conduces to a loss of Spatial Reuse (a reuse of a space) that is greatly characteristic of the RPR. As a matter of fact, the system based on the plan described above comes to have substantially the same operation as the frame is transmitted and received in a case where the bridge device on the Ethernet actualized at the present is connected onto the ring. Therefore, a problem occurs afresh, wherein the meaning of utilizing the RPR is lost.

These problems are derived from the RPR MAC header destination address becoming none of the addresses of the nodes on the ring because of transmitting the frame transparently. In other words, the on-the-ring node that should receive (should do forwarding) cannot be designated uniquely by the MAC address, which becomes a factor for causing the respective problems as described above by the transparent bridge system.

Such being the case, the IEEE802.17 Committee is examining a method of scheming to obviate the problems in such a form as to add an original EMAC address to the RMAC frame in the case of translating the EMAC frame into the RMAC frame. This is called an enhance bridge system. The following format plans are proposed for the system.

(Plan-A) A System for Transmitting and Receiving by Adding the MAC Address to the RPR Format FIG. 29 shows a format plan in which the MAC address is added. This plan-A is a method of invariably adding an address, as a destination, of the on-the-ring node to the Ethernet frame coming from outside the ring by the on-the-ring node. The plan-A is capable of obviating the problems. In order to make the off-the-ring MAC address corresponding to the on-the-ring MAC address, a transparent bridge learns which bridge node on the ring the station off the ring is connected to and sorts out it into a table format (e.g., Non-Patent document 9, slide 17).

The plan-A has, however, the following defects. Namely, the plan-A has not compatibility with the RPR format used so far. Therefore, a device manufactured base don the plan-A is impossible of communicating with the existing device. This implies that an existing LSI for the RPR MAC layer processing that has been designed for the RPR device, cannot be used. Further, in the plan-A, al the nodes on the ring must execute the process (the process of adding the on-the-ring MAC address). Hence, in the communications between the station nodes on the ring, the same address must be set in the RPR MAC address and in the MAC address. This kind of process is futile as far as the communications between the on-the-ring station nodes are concerned. Moreover, the format related to the plan-A has such an aspect that the overhead is always large and data communication efficiency is poor.

(Plan-B) A Plan for Distinguishing by a Flag as to Whether the MAC Address is Added or not An addition of the MAC address is originally a piece of information needed only for the case where the bridge is related to the communications. Accordingly, there is considered a plan for adding the MAC address only in such a case that one (or both) of the transmitting and receiving sides is the bridge node. This plan-B is shown in FIG. 30. A difference between the plan-A and the plan-B is given as follows. Namely, the plan-A is that the format is changed by adding the RPR MAC address at all times. By contrast, the plan-B is that the RPR MAC address is added only in a required case, and the communications are performed in the existing format other than this case. Accordingly, the addition of the RPR MAC address is not applied to the communications between the station nodes on the ring.

The on-the-ring bridge node and station node, however, must distinguish between the addition and non-addition of the MAC address, depending on the communication partner. Therefore, the information (flag: 1 bit at the minimum) for judging whether the MAC address is added to the RPR header or not, is needed.

The plan-B has the following defects. Namely, the format to which the flag is added as in the plan-B has no compatibility with the original format as in the plan-A. Further, the plan-B must involve adding the flag to the RPR header afresh. Hence, there is no compatibility with the device manufactured based on the existing specifications, and the existing RPR MAC layer LSI can not be used. The plan-B, however, unlike the plan-A, enables the communications with the existing device with respect to the communications between the station nodes. Moreover, in the plan-B, the RPR MAC address is not always added. Therefore, the overhead for a whole traffic is smaller than the plan-A.

(Plan-C) A Plan for Encapsulating the Whole Frame in the Bridge

For giving the compatibility to the format, there is considered a method of encapsulating the whole MAC frame (EMAC frame) with the RPR MAC frame in the bridge. A format related to the plan-C is shown in FIG. 31 (for example, Non-Patent document 9, slide 21, Non-Patent document 10, and slide 11).

The plan-C has a necessity of registering afresh ET (Ethernet Type) for indicating encapsulation (an application to IETF is required). It is not a problem to simply encapsulate the MAC frame in the plan-C. If this remains as it is, it follows that protocols (IEEE802.1Q-VLAN, MPLS, etc.) for adding a label to between the header and the payload can not be supported (IEEE802.17 has a rule enabling these protocols to be supported. For processing on these protocols, new ETs are also required to be registered, and the ETs just corresponding to the number of protocols for processing are needed.

In any plan among the plans A through C explained above, in the case where the transmitting destination is the off-the-ring station subordinate to the bridge, when a mapping between the MAC address of the station and the MAC address of the on-the-ring bridge node is learned, the transmission becomes possible by adding the MAC address corresponding to a transmitting source and a destination on the ring.

In the case of newly adding the station subordinate to the bridge, there is a case where a mapping relationship therebetween is not yet learned. In this case, it is required that the frame be sent to all the nodes (precisely to only the bridges therein). Hence, a broadcast MAC address is added as a destination MAC address. The frame (the RPR frame) to which the broadcast MAC address is added, is received by each of the nodes. The bridge node receiving the RPR frame translates the RPR frame into an Ethernet frame and thus sends it to all the subordinate ports off the ring. If there is a device 8a device having MACDA of the Ethernet frame) having the MAC address in any one of the off-the-ring ports, the device is capable of receiving a desired Ethernet frame. The station ruled out of the destination of the Ethernet frame receives the Ethernet frame, interprets its body frame and thereafter discards it.

For actualizing the processes described above, in any plan among the plans A through C, the new format (or the encapsulated format) to which the MAC address is added must be interpreted by the node (see FIG. 32). This implies that neither the plan-A nor the plan-B nor the plan C enables the device for processing only the existing format to be disposed within the ring (see FIG. 33).

For others, technologies described in the following Non-Patent documents 11 through 17 are given as the prior arts related to the invention of this application.

[Patent document 1] Specification of U.S. Pat. No. 6,314,110

[Non-Patent document 1] IEEE Draft P802.17/D1.0 (P802-17D1-ob.pdf), chapters 5, 6, 8 and 10, Internet

[Non-Patent document 2] Bridging Ad-Hoc (BAH) Overview (bah-upd-01.pdf), Internet, May 2002

[Non-Patent document 3] Bridging on 802.17 LAN with 802.1D/Q Compliance (bah-dot1-01.pdf), Internet, May 2002

[Non-Patent document 4] Basic Bridging Compliance (bah-basic-03.pdf), Internet, July 2002

[Non-Patent document 5] Enhanced Bridging Spatial Reuse of 802.17 Bridge Traffic (bah-enhnc-02.pdf), Internet, July 2002

[Non-Patent document 6] IEEE802.17 Frame Structure and Bridging Ad-Hoc Support (bah-frm-01.pdf), Slides 11, 17, 21, Internet, May 2002

[Non-Patent document 7] Flooding in 802.17 Networks (bah-fld-01.pdf), Internet, May 2002

[Non-Patent document 8] 802.1D/Q Compliance and Spatial Reuse (bah-spt-01.pdf), Slides 7-8, 9-10, 11-12, Internet, May 2002

[Non-Patent document 9] BAH 802.17 Frame Structure Requirements (bah-frame-02.pdf), Slide 11, Internet, June 2002

[Non-Patent document 10] BAH Summary (bah-motion), Internet, May 2002

[Non-Patent document 11] 802.17 presentations (bah-fld-01.pdf), Internet, July 2002

[Non-Patent document 12] Bridging Ad-Hoc (BAH) Overview (bah-over-01.pdf), Internet, July 2002

[Non-Patent document 13] 802.17 Bridging Compliance Roadmap (bah-road-01.pdf), Internet, July 2002

[Non-Patent document 14] TA Document IEEE802.17-11 July 2001/0.40:3, October 2001 (Basic-Bridging-Draft-Text.pdf), Internet, July 2002

[Non-Patent document 15] Proposed D0.3 Changes for Enhanced Bridging Jul. 1, 2002 RESILIENT PACKET RING (RPR) (bridge-spat-draft02.pdf), Internet, July 2002

[Non-Patent document 16] IEEE Draft P802.17/D0.3 Contribution, DRAFT STANDARD FOR (Flooding.pdf), Internet, July 2002

[Non-Patent document 17] IEEE Draft P802.17/D0.3 Contribution Jun. 28, 2002, RESILIENT PACKET RING (RPR) (Formats.pdf), Internet, July 2002

SUMMARY OF THE INVENTION

One of the objects of the invention is to provide, with respect to the problems described above, a technology related to a RPR network that eliminates a necessity for a distinguishing flag/ET indicating that a MAC address is added and a frame is encapsulated.

Further, one of the objects of the invention is to provide a technology related to the RPR network in which a bridge node on a ring has means for receiving a frame with an unknown address.

The invention adopts the following architectures in order to solve the problems described above.

Namely, the invention is a RPR network system in a RPR network where a plurality of station nodes terminating a MAC frame and a plurality of bridge nodes forwarding the MAC frame are connected to one or more rings, wherein each of the station nodes, in the case of transmitting the MAC frame to other station node, transmits a RPR MAC frame in which a MAC address of the other station node is set in a destination MAC address, and transmits, in the case of transmitting the MAC frame to a station off the ring that is connected an unspecified bridge node, a RPR MAC frame into which this MAC frame is encapsulated in such a state that the unspecified bridge node can capture it, each of the bridge node, in the case of receiving the MAC frame in which a MAC address of the off-the-ring station connected to other bridge node is set in a destination address from the off-the-ring station connected to the bridge node itself, transmits a RPR MAC frame into which the MAC frame is encapsulated in such a state that he other bridge node can capture it, and, in the case of receiving a MAC frame in which a MAC address of an unspecified station node is set in a destination MAC address from the off-the-ring station connected to the bridge node itself, transmits the MAC frame in a way that translates it into a RPR MAC frame, each of the station nodes captures the RPR MAC frame that is not encapsulated, and each of the bridge nodes captures the RPR MAC frame into which the MAC frame is encapsulated, and transmits the MAC frame within the captured RPR MAC frame to the off-the-ring station connected to the bridge node itself.

In the invention, the MAC frame is, for example, an EMAC frame, and the RPR frame is a RMAC frame.

Further, the invention can be applied to a ring network configured of one or more rings, for instance, a RPR network configured of bidirectional dual rings examined by IEEE802.17, wherein station nodes and bridge nodes exist in mixture.

The station node has a function of executing a process of terminating a MAC frame, i.e., a function of becoming a transmitting source and a transmitting destination. Further, the bridge node has a function of forwarding the MAC frame to a network on the same or a different protocol as or from the protocol possessed by the bridge node itself without terminating the MAC frame.

Moreover, the station node, when transmitting the MAC frame to the station on the same ring, can be constructed to assemble a RPR MAC frame in a RPR MAC format defined in IEEE802.17 and to thus transmit it.

Furthermore, the station node, when transmitting the MASC frame to the off-the-ring station connected to an edge of the bridges on the same ring, can be constructed to translate the MAC frame into a format suited to an off-the-ring protocol, then set it as a data field, further translate it into a format of its being encapsulated in the RPR MAC format, and transmit it to the bridge node on the ring.

Further, when the station off the ring transmits the MAC frame to the station node on the same ring via the bridge node on the ring, it can be constructed to transparently translate the MAC frame sent from the off-the-ring station into the RPR MAC frame in the bridge node on the ring and to transmit it to the on-the-ring station node.

Moreover, when transmitting the MAC frame to the off-the-ring station connected to an edge of other bridge nodes on the same ring, it can be constructed to set the MAC frame sent from the off-the-ring station it as a data field in the on-the-ring bridge node, then translate it into a format of its being encapsulated in the RPR MAC format, and transmit it to other bridge node on the ring.

This enables an architecture wherein the on-the-ring station node receives the MAC frame invariably in the RPR MAC frame format, the on-the-ring bridge receives invariably the RPR MAC frame into which the MAC frame based on the connection protocol with the off-the-ring station is encapsulated, and the bridge decapsulates it and performs forwarding of it to the station as an off-the-ring recipient.

According to the invention, there is no necessity from the receiving side to judge whether the frame received by the on-the-ring station node and bridge node is encapsulated or not. Namely, the station node and the bridge node, which correspond to the receiving sides of the RPR MAC frame, may not judge whether the MAC frame is encapsulated or not. Accordingly, the distinguishing flag and special ET explained in the prior art are not needed. A compatibility with the existing RPR nodes can be thereby maintained.

It is preferable that the invention be constructed such that each of the station nodes and each of the bridge nodes have a table registered with the MAC addresses of all the station nodes and bridge nodes connected to the rings, each of the station nodes, in the case of transmitting the MAC frame, transmits the MAC frame in a RPR MAC format if the destination MAC address of the MAC frame is registered in the table, and transmits the RPR MAC frame into which the MAC frame is encapsulated if the destination MAC address is not registered in the table, and each of the bridge nodes, in the case of forwarding the MAC frame received from the off-the-ring station connected to the bridge node itself, transmits the MAC frame in a way that translates the MAC frame into the RPR MAC frame if the destination MAC address of the MAC frame is registered in the table, and transmits the RPR MAC frame into which the MAC frame is encapsulated if the destination MAC address is not registered in the table.

As the table, there can be applied, for instance, a topology map table specified to be included according to RPR, registered with the MAC addresses of all the stations/bridges on the rings, distances/directions from the self-station/bridge.

This being thus done, when the on-the-ring station node transmits the MAC frame and when the on-the-ring bridge node routes the MAC frame, if the destination MAC address thereof is registered in the table, the recipient is judged to be the on-the-ring station, whereas if not registered, the recipient is judged to be the off-the-ring station, and it is possible to determine whether the transmission object MAC frame is transmitted transparently as it is or the MAC frame is encapsulated.

Moreover, it is preferable that the invention be constructed such that each of the station nodes and each of the bridge nodes have a mapping table stored with the MAC addresses of the bridge nodes and the MAC addresses of the off-the-ring stations connected to the bridge nodes in a way that make them corresponding to each other, and each of the station nodes and each of the bridge nodes, in the case of transmitting the RPR MAC frame into which the MAC frame is encapsulated, set the MAC address of the bridge node in a destination MAC address of the RPR MAC frame when the mapping table is stored with the bridge node MAC address corresponding to the destination MAC address of the MAC frame.

Still further, it is preferable that the invention be constructed such that each of the station nodes and/or each of the bridge nodes retain a multicast address to a group which all the plurality of bridge nodes belong to, and each of the station nodes and each of the bridge nodes, in the case of transmitting the RPR MAC frame into which the MAC frame is encapsulated, set the multicast address in a destination MAC address of the RPR MAC frame when the mapping table is not stored with the bridge node MAC address corresponding to the destination MAC address of the MAC frame.

Thus, the multicast MAC address to a group into which all the bridges on the ring are set, is registered, and the frame is transmitted to reach all the bridge nodes by setting the destination MAC address of the RPR MAC frame (into which the MAC frame is encapsulated) to the multicast address when unable to uniquely designate the destination MAC address of the RPR MAC frame. The encapsulated MAC frame can be thereby made to reach the off-the-ring station as an edge to the bridge nodes.

Namely, it is feasible to provide means for allowing only the on-the-ring bridge node to receive the frame with its address unknown.

Moreover, it is preferable that the invention be constructed such that each of the bridge nodes, in the case of transmitting the RPR MAC frame into which the MAC frame is encapsulated and in which the bridge node MAC address corresponding to the destination MAC address of the MAC frame is set in a destination MAC address, sets its own MAC address in a source MAC address of the RPR MAC frame, and the station node and/or the bridge node forwarding the RPR MAC frame into which the MAC address transmitted from the bridge node is encapsulated, stores the mapping table with a source MAC address of the RPR MAC frame and a source MAC address of the MAC frame within the RPR MAC frame in a way that makes them corresponding to each other.

Further, the invention is a bridge node connected, together with a plurality of station nodes terminating a MAC frame, to one or more rings configuring a RPR network, wherein the bridge node, in the case of receiving the MAC frame in which a MAC address of other off-the-ring station connected to other bridge node connected to the ring is set in a destination MAC address, transmits a RPR MAC frame into which the MAC frame is encapsulated in such a state that the other bridge node can capture it, and the bridge node, in the case of receiving the MAC frame in which a MAC address of an unspecified station node is set in a destination MAC address from the station, transmits the MAC frame in a way that translates the MAC frame into a RPR MAC frame.

Still further, the invention is a station node connected, together with a plurality of bridge nodes forwarding a MAC frame, to one or more rings configuring a RPR network, wherein the station node, in the case of transmitting the MAC frame transmitted to other station not connected to the ring, transmits a RPR MAC frame in which a MAC address of the other station node is set in a destination MAC address, and the station node, in the case of transmitting the MAC frame to the off-the-ring station connected to an unspecified bridge node, transmits the RPR MAC frame into which the MAC frame is encapsulated in such a state that the unspecified bridge node can capture it.

Moreover, the invention is a RPR card installed into a bridge node connected, together with a plurality of station nodes terminating a MAC frame, to one or more rings configuring a RPR network, wherein the RPR card, in the case of receiving the MAC frame transmitted from a station off the ring and in which a MAC address of other off-the-ring station connected to other bridge node is set in a destination MAC address, transmits a RPR MAC frame into which the MAC frame is encapsulated in such a state that the other bridge node can capture it, and the RPR card, in the case of receiving the MAC frame in which a MAC address of an unspecified station node is set in a destination MAC address from the station, transmits the MAC frame in a way that translates the MAC frame into a RPR MAC frame.

Further, the invention is a MAC frame forwarding method for a bridge node connected, together with a plurality of station nodes terminating a MAC frame, to one or more rings configuring a RPR network, wherein the bridge node transmits, in the case of receiving the MAC frame transmitted from an off-the-ring station and in which a MAC address of the other off-the-ring station connected to other bridge node connected to the ring is set in a destination MAC address, a RPR MAC frame into which the MAC frame is encapsulated in such a state that the other bridge node can capture it, and the bridge node transmits, in the case of receiving the MAC frame from the station in which a MAC address of an unspecified station node is set in a destination MAC address, the MAC frame in a way that translates the MAC frame into a RPR MAC frame.

Furthermore, the invention is a MAC frame forwarding method for a RPR card installed into a bridge node connected, together with a plurality of station nodes terminating a MAC frame, to one or more rings configuring a RPR network, wherein the RPR card transmits, in the case of receiving the MAC frame transmitted from an off-the-ring station and in which a MAC address of the other off-the-ring station connected to other bridge node connected to the ring is set in a destination MAC address, a RPR MAC frame into which the MAC frame is encapsulated in such a state that the other bridge node can capture it, and the RPR card transmits, in the case of receiving the MAC frame from the station in which a MAC address of an unspecified station node is set in a destination MAC address, the MAC frame in a way that translates the MAC frame into a RPR MAC frame.

BRIEF DESCRIPTION OF THE DRAWINGS

FIG. 4 is an IP/MAC address table on each device (a RPR node) in the embodiment;

FIG. 5 is a diagram showing an example of a topology map table retained on each RPR node shown in FIG. 3;

FIG. 6 is an explanatory diagram of an ARP frame format between stations in the embodiment;

FIG. 8 is an explanatory diagram of a format of an ARP frame forwarded between a station node and the station;

FIG. 9 is an explanatory diagram of a format of the IP data packet forwarded between the station node and the station;

FIG. 12 is a diagram showing an example of a data structure of a learning table/MAC address mapping table;

FIG. 20 is a table (Table 1) showing an example of a table (a topology map table) retained by the node on the ring;

FIG. 21 is a table (Table 2) showing an example the topology map table of the node after a failure has occurred between the nodes on the ring;

DESCRIPTION OF THE PREFERRED EMBODIMENTS

Embodiments of the invention will hereinafter be described with reference to the drawings. Note that constructions of the embodiments are an exemplification, and the invention is not limited to the constructions of the embodiments.

[Outline of the Invention]

Figure 1:
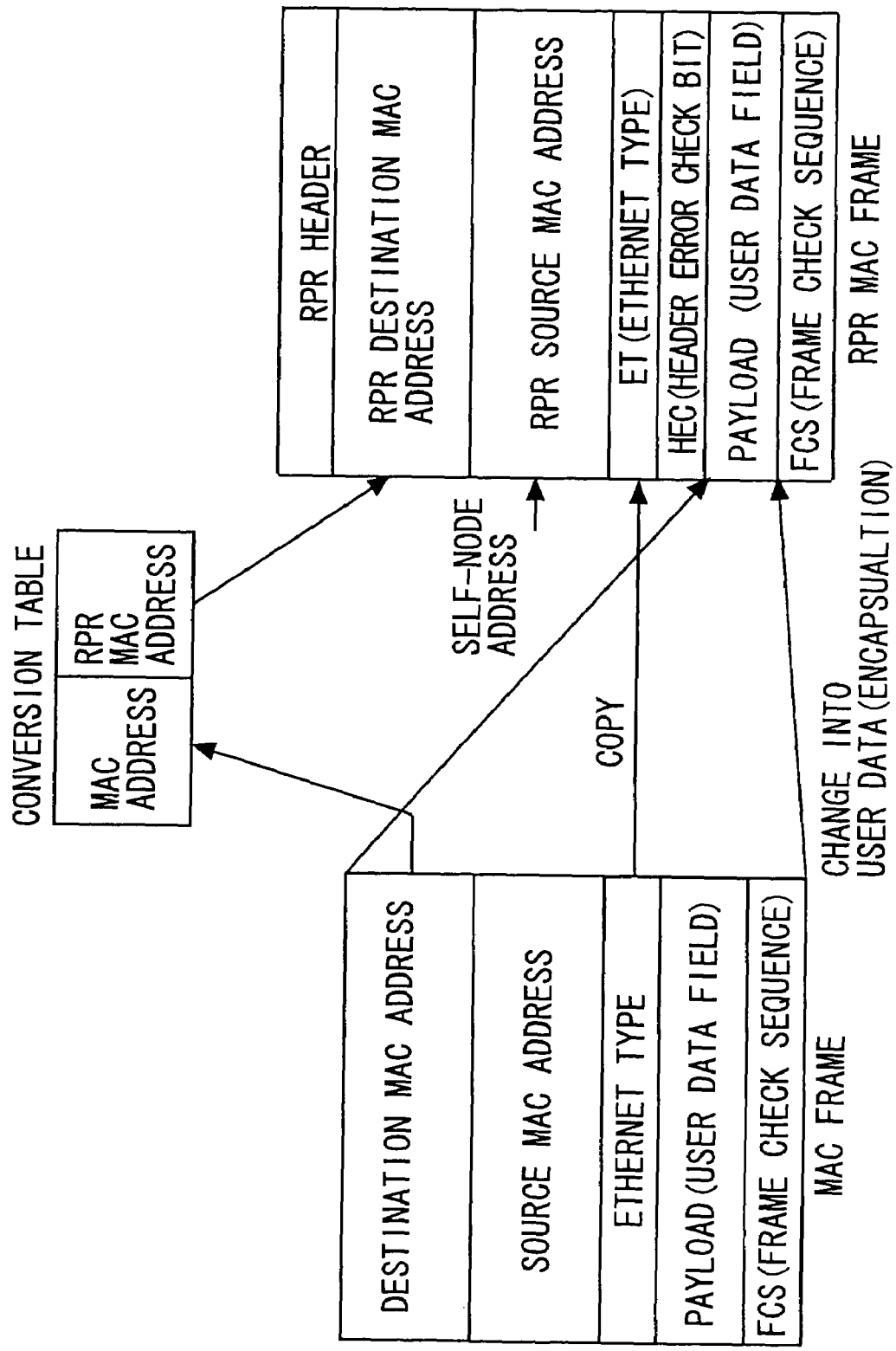
FIG. 1 is a diagram showing a format translation method according to the invention.
Figure 2:
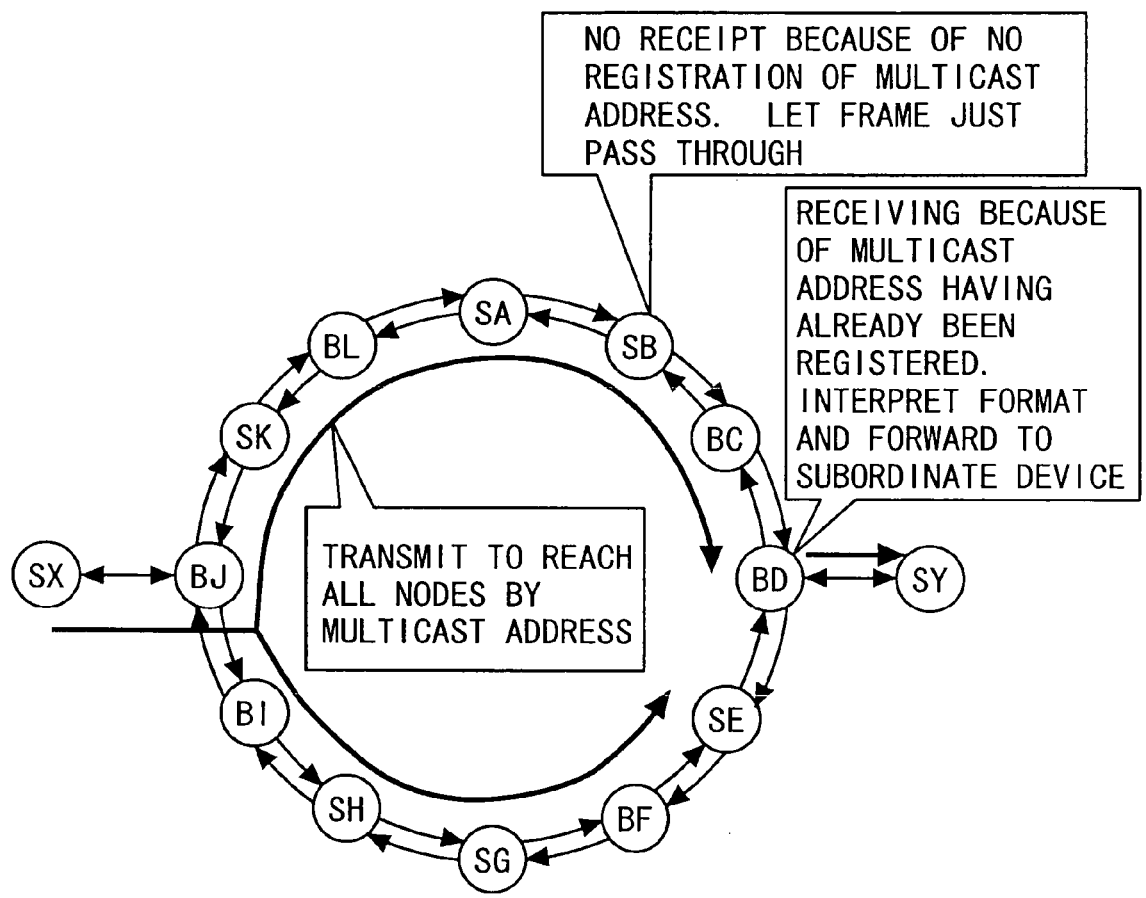
FIG. 2 is an explanatory diagram of a frame transmission in a case where a mapping relationship of a MAC address is not yet learned.

To start with, an outline of the invention will be explained. FIG. 1 is a diagram showing a format translation method according to the invention, and FIG. 2 is an explanatory diagram of a frame transmission in a case where a mapping relationship of a MAC address is not yet learned.

A format translation applied to the invention is shown in FIG. 1. This format translation is of the same encapsulation system as the C-plan given by way of the prior art. To be concrete, a MAC frame (EMAC frame) is encapsulated into a RMAC frame as follows. Namely, the whole EMAC frame is set as a payload (a user data field) of the RMAC frame; and a RPR header, a RPR MAC destination address (RPR MAC DA), a RPR MAC source address (RPR MAC SA), a ET (Ethernet Type), a HEC (Header Error Check bit) and a FCS (Frame Check Sequence), are added to the payload as shown in FIG. 1, thereby assembling a RMAC frame.

At this time, the MAC DA of the EMAC frame is translated into a RPR MAC address mapping thereto by use of a MAC address (EMAC address)-RPR MAC address translation table (retained on a RPR node that executes the encapsulation), and this is set as a RPR MAC DA of the RMAC frame. Further, a MAC address (a self-node address) of the RPR node that executes the encapsulation is set as a RPR MAC SA of the RMAC frame. Moreover, the ET of the EMAC frame is copied and is set as an ET of the RMAC frame. Then, recalculated values are set as a HEC and a FCS of the RMAC frame. The invention does not, however, unlike the C-plan, require registering a net ET (Ethernet Type).

Further, the invention is applied to a RPR ring (a RPR network) configured of a plurality of station nodes and a plurality of bridge nodes. A frame transmission process in the RPR network is substantially the same on the bridge node and on the station node.

Figure 23:
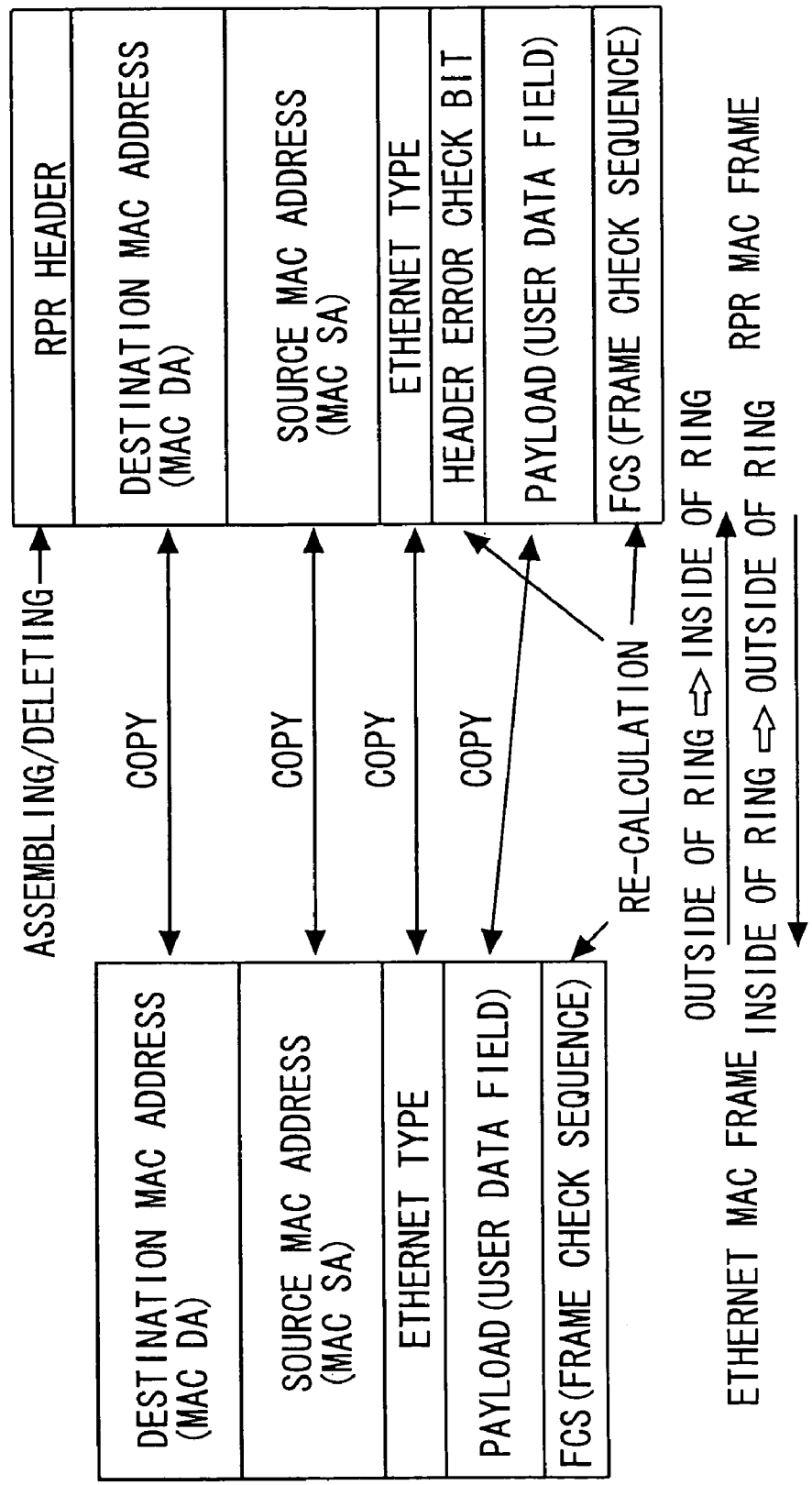
FIG. 23 is an explanatory diagram of a frame process executed by a transparent bridge pursuant to IEEE802.1D.
Figure 24:
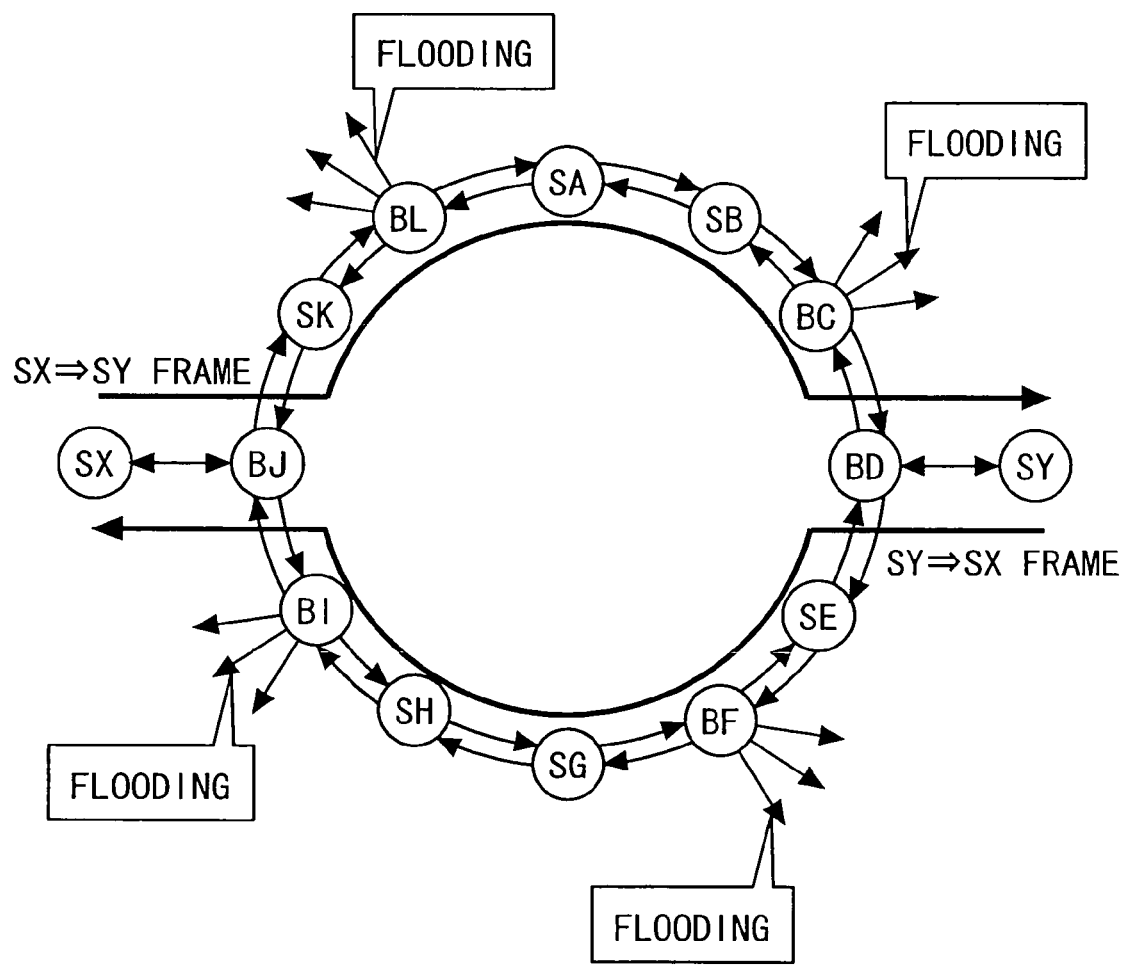
FIG. 24 is an explanatory diagram of flooding occurred.
Figure 25:
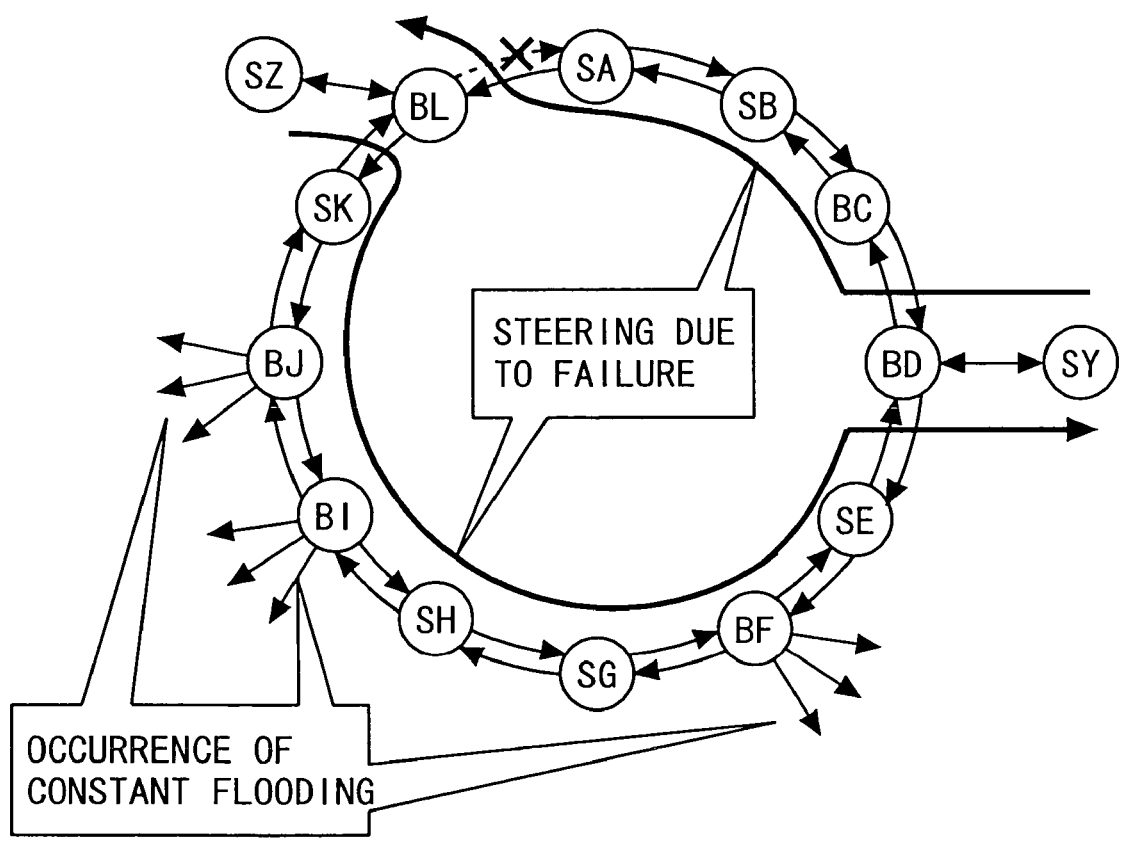
FIG. 25 is an explanatory diagram of the occurrence of the flooding when in a steering operation due to the failure.
Figure 26:
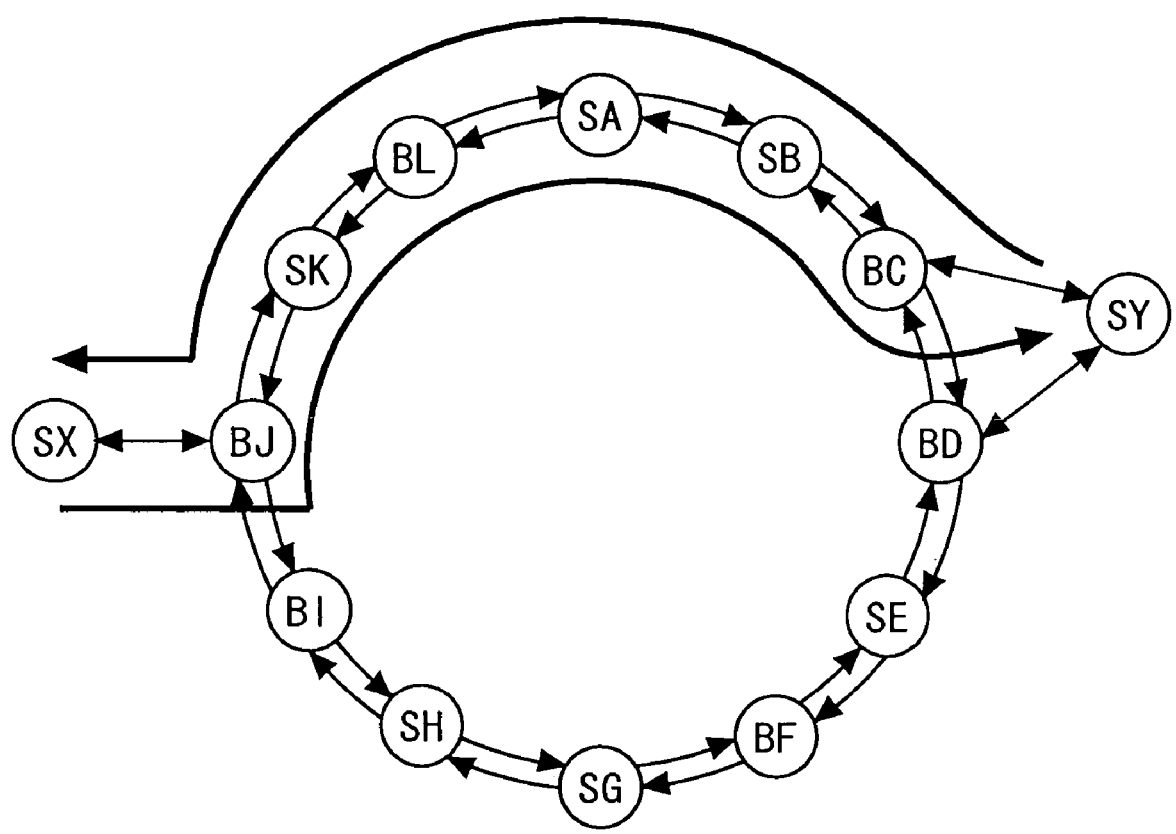
FIG. 26 is a diagram showing an example of the RPR network having the station connected to two bridges (a normal state)
Figure 27:
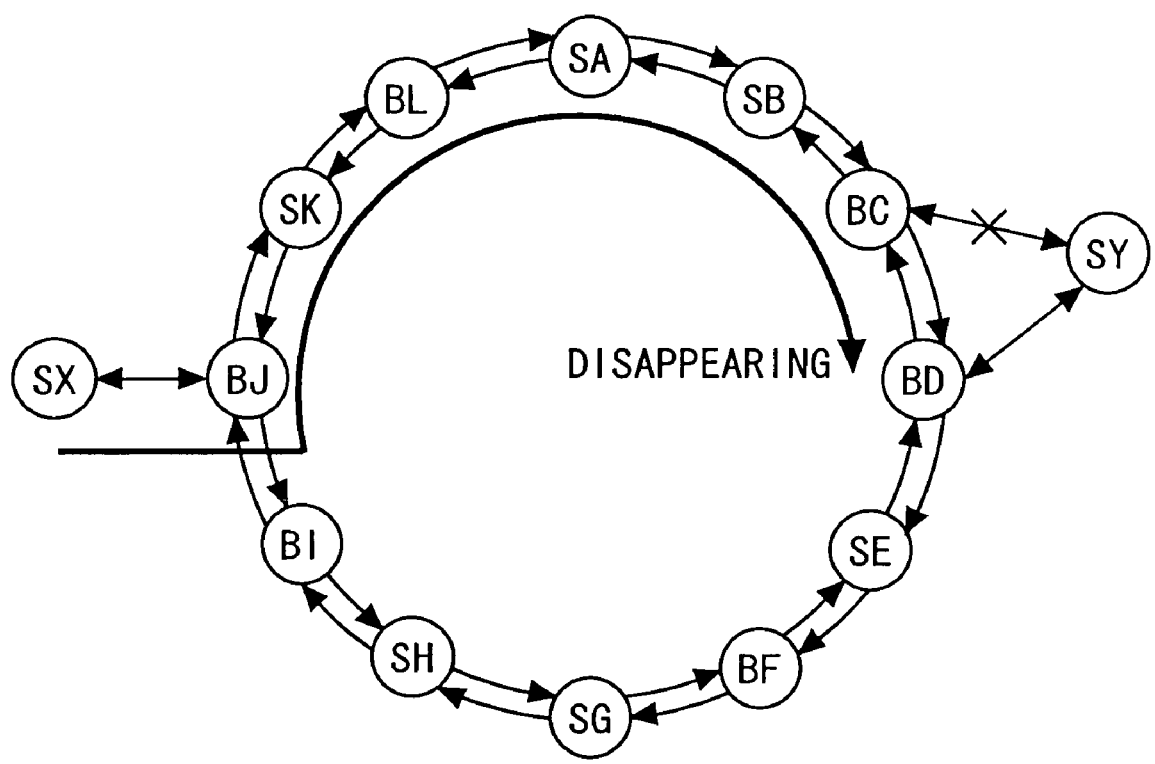
FIG. 27 is a diagram showing an example of the RPR network having the station connected to two bridges (a failure state between the bridge and the off-the-ring station)
Figure 28:
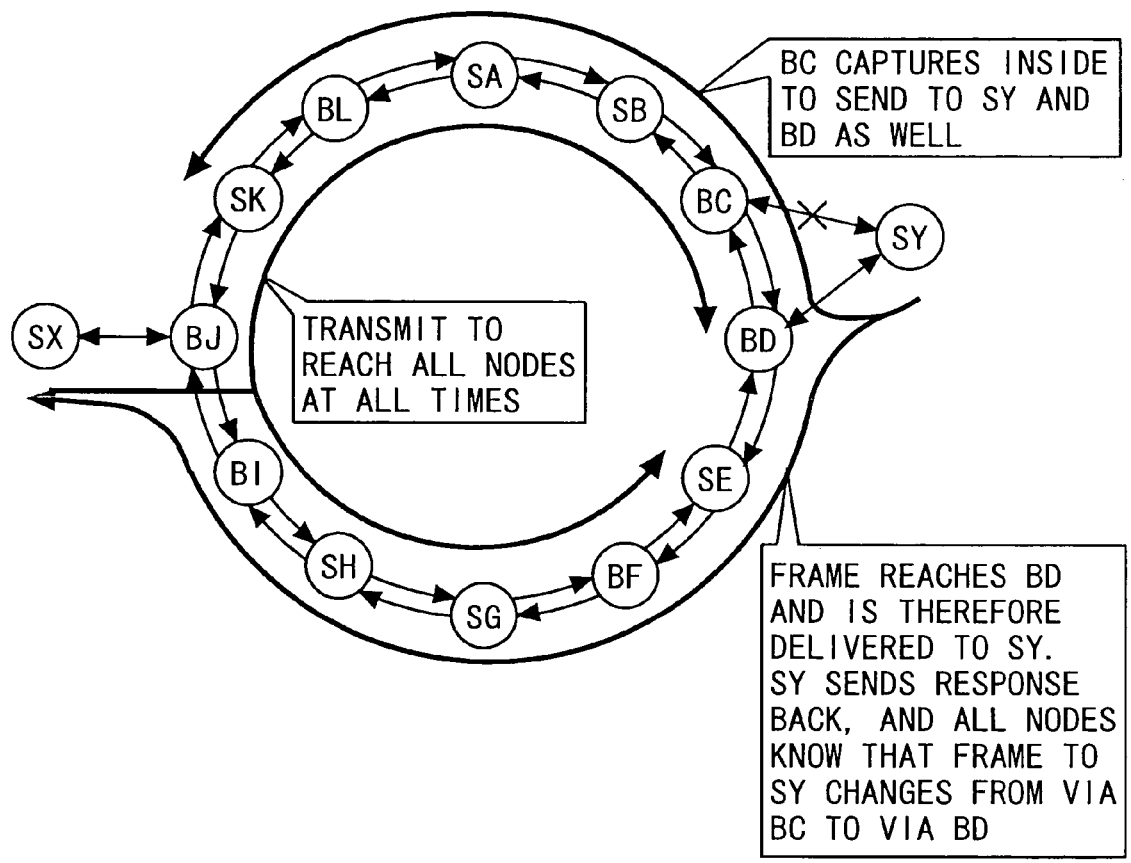
FIG. 28 is a diagram showing plans of a method of solving a problem arising from the frame transmission to all the nodes on the rings.
Figure 29:
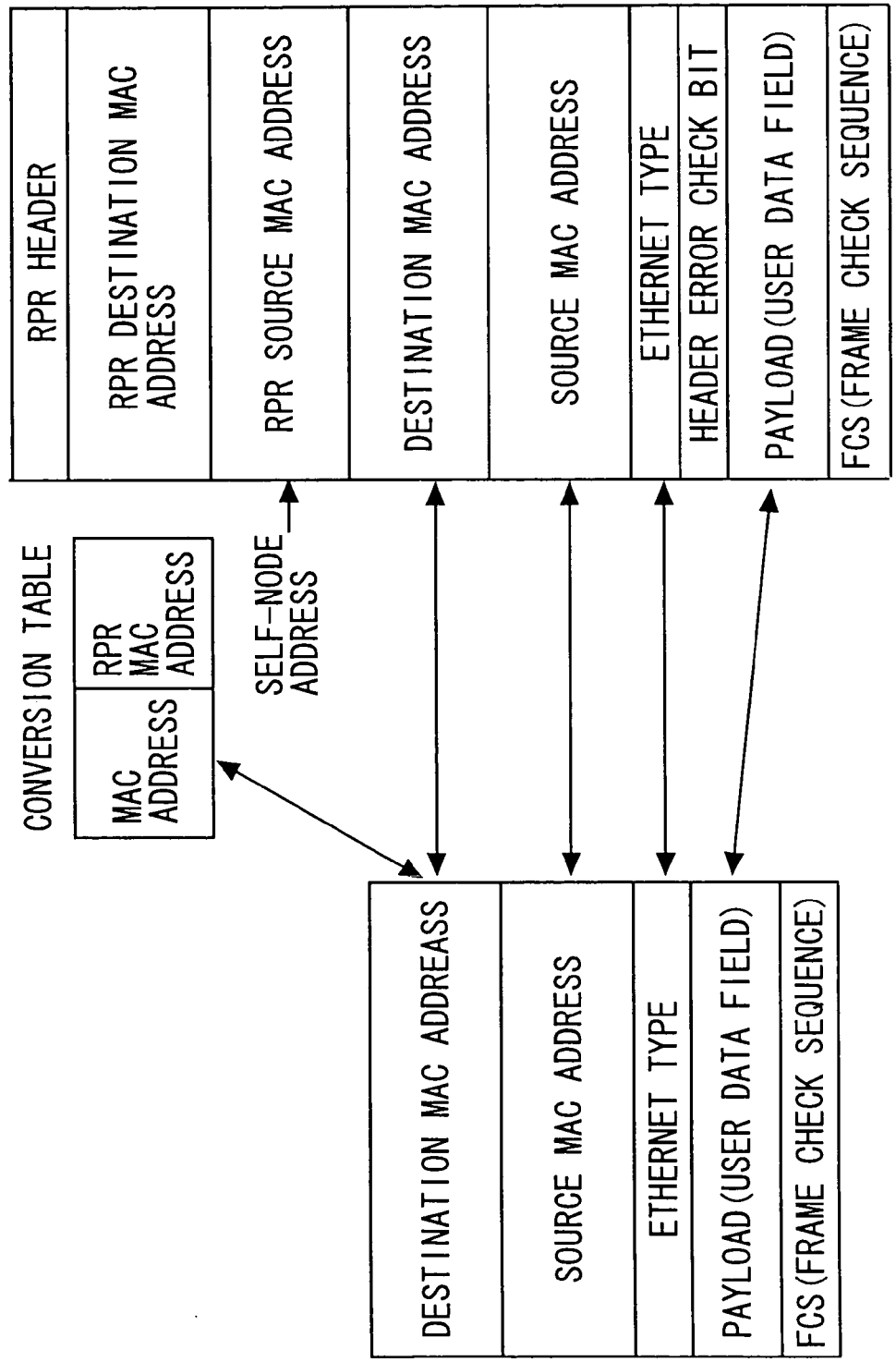
FIG. 29 is an explanatory diagram of a plan of adding the MAC address to the RPR format.
Figure 30:
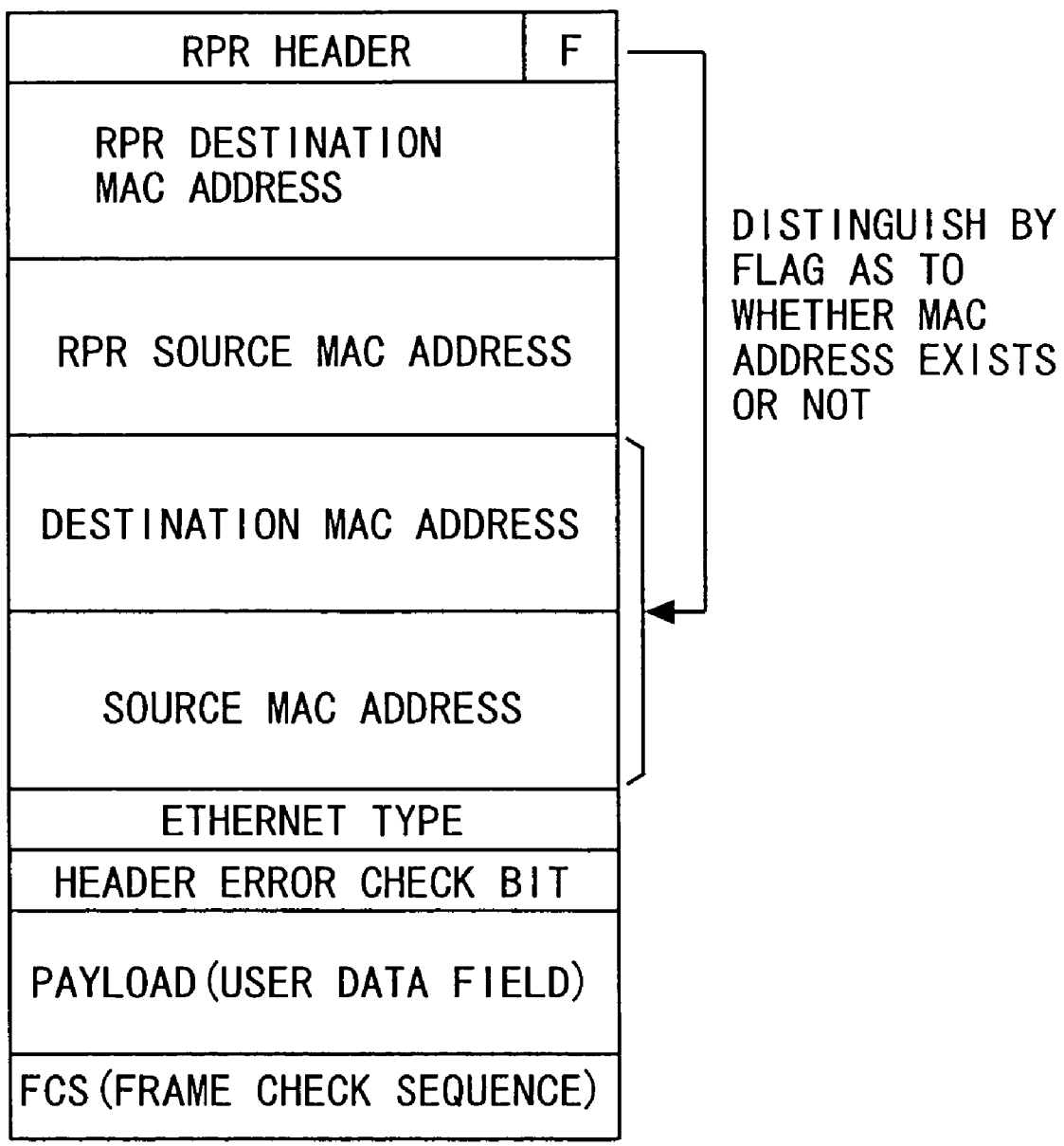
FIG. 30 is an explanatory diagram of a plan of distinguishing an existence of the MAC address by attaching a flag to a RPR header.
Figure 31:
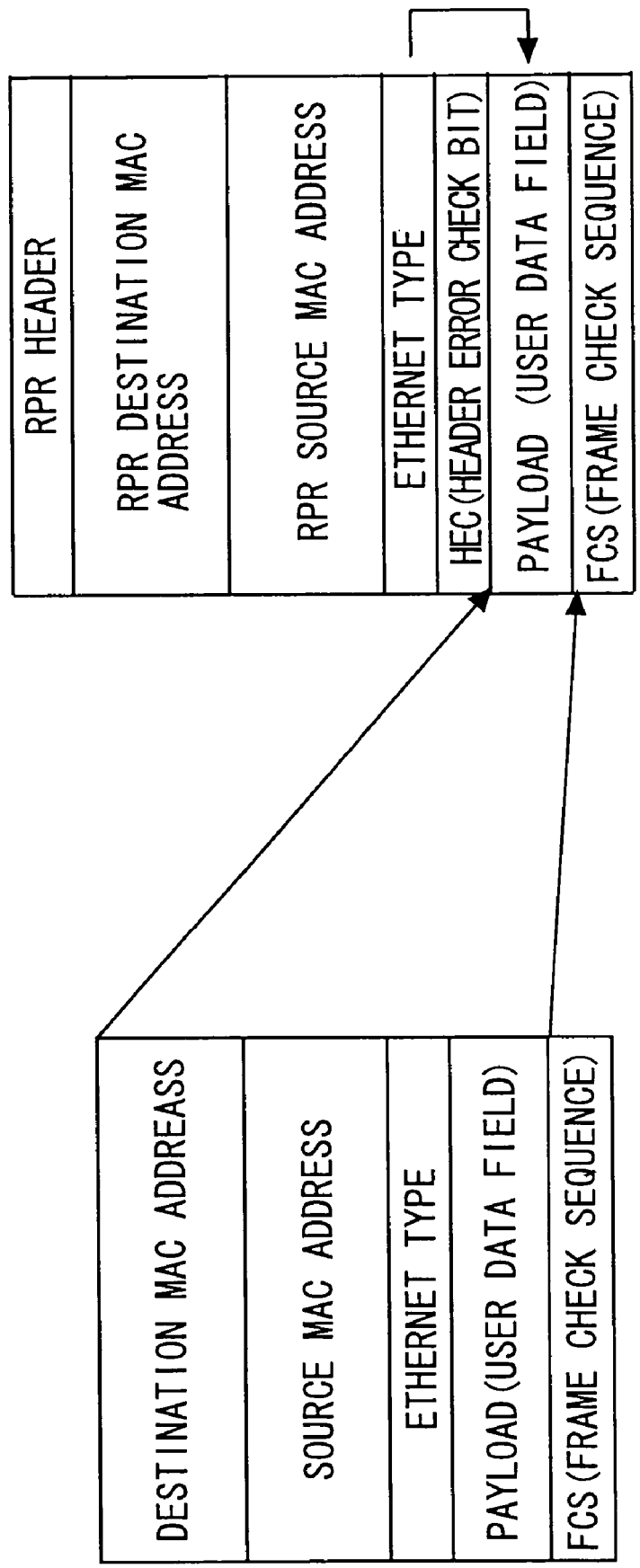
FIG. 31 is an explanatory diagram of a plan of encapsulating the MAC frame.
Figure 32:
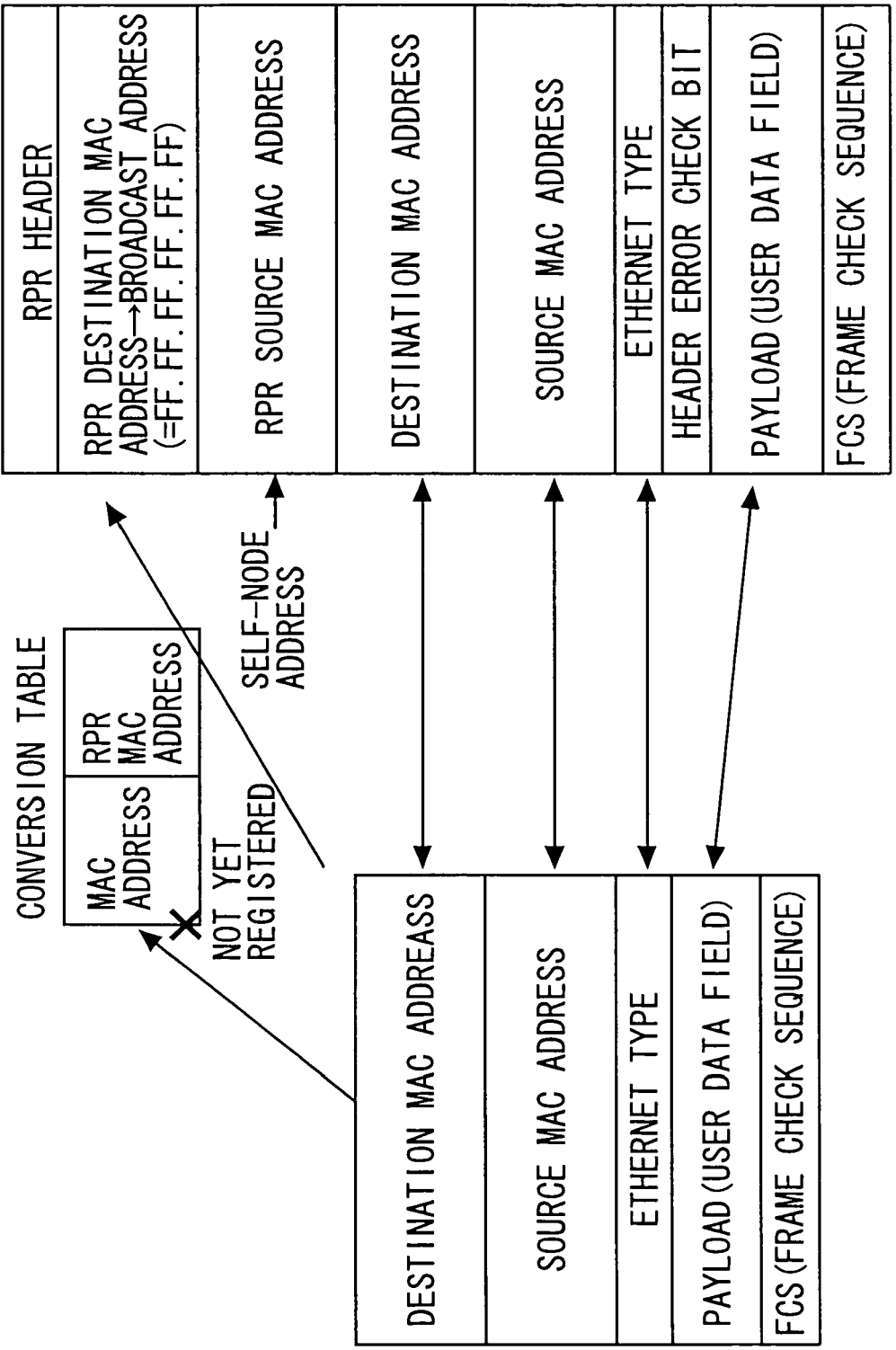
FIG. 32 is an explanatory diagram of a process (a process in a case where the destination RPR MAC address is designated to be broadcast) in a case where a mapping MAC address is not registered in a translation table.
Figure 33:
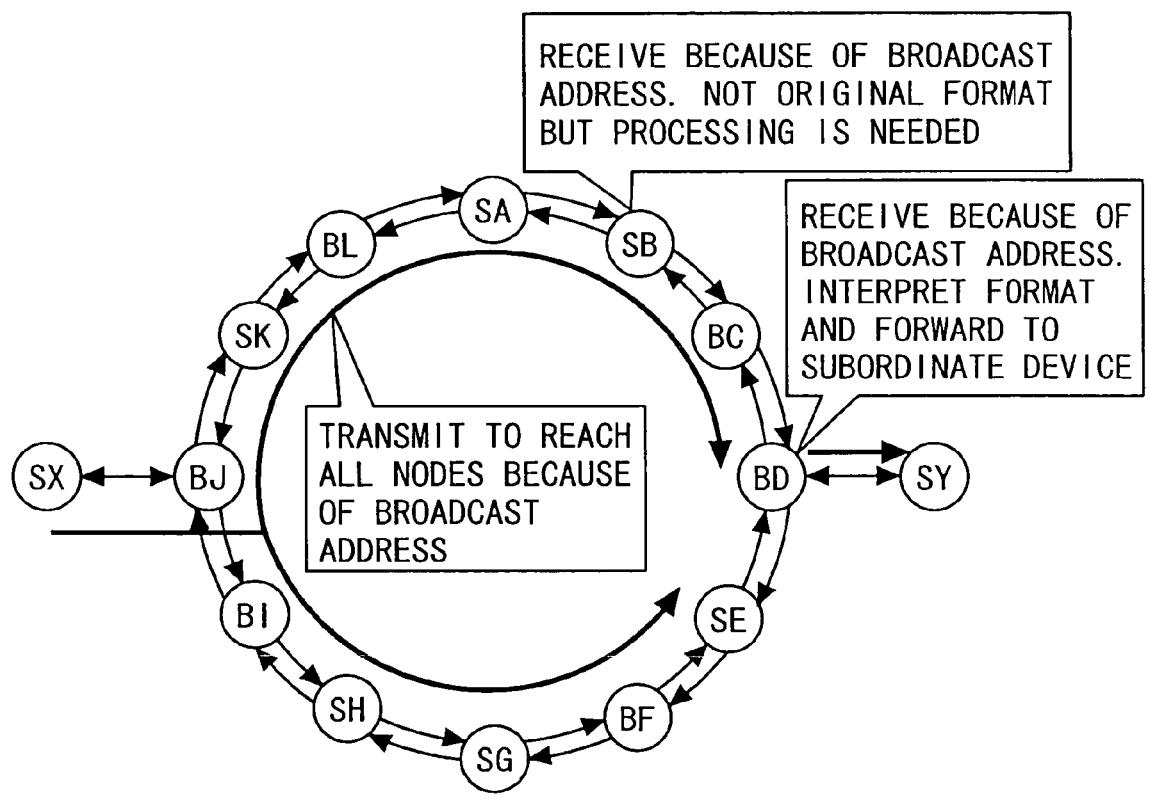
FIG. 33 is an explanatory diagram of a process (a process in the case where the destination RPR MAC address is designated to be broadcast) in a case where the mapping MAC address is not registered in the translation table.

Concretely, it is judged whether a destination node (a node designated by the MAC DA) of a receipt frame is the station node or the bridge node, the encapsulation shown in FIG. 1 is effected in the case of the bridge node, and the transmission is executed without performing the encapsulation (through a transparent translation (see FIG. 23)) in a case where it is not (but is the station node).

Through this, if the frame destination node is the bridge node, the receipt frame is invariably encapsulated and thus sent, and if the destination node is the station node, it is not invariably encapsulated and is thus sent.

Accordingly, the station node, upon receiving the frame, executes a process for the non-encapsulated frame, and the bridge node may, upon receiving the frame, execute a process for the encapsulated frame. This eliminates a necessity of judging whether the Ethernet type based encapsulation has been done or not. Hence, a registration of a new Ethernet type becomes unnecessary.

Furthermore, for actualizing the invention, the RPR node on the frame transmitting side is required to know whether the destination station is the station node on the ring or a station connected to the bridge node. Information for judging this is acquired from a topology map table as updated information about the respective RPR nodes on the ring, the map table being retained on each RPR node on the ring.

Namely, each RPR node, on the occasion of transmitting the frame, searches as to whether or not the MAC address (MAC DA) of the destination node exists in a MAC address group registered in the topology map table thereof, if it exists on the topology map table, the destination node is the station node on the ring, and hence its transmission is conducted without performing the encapsulation.

If the destination node MAC address in the frame does not exist in the topology map table, it follows that there occurs a transmission to a station outside the ring that is connected to the bridge node, and hence it may be transmitted after being encapsulated.

For effecting the encapsulation, it is the same as the plans A-C described in the prior art to create, learn and refer to a link mapping table (a translation table) for the MAC addresses of the bridge nodes on-the-ring and the MAC addresses of the stations subordinate thereto.

Further, there is the case where the MAC address mapping relationship is not yet learned in the transmission of the frame. In this case, it is required that the frame be transmitted to all the bridge nodes on the ring. At this time, if a broadcast address is used as the destination node MAC address, the station nodes on the ring also become recipients.

Such being the case, a multicast address is used for solving the problem. Namely, a multicast address to one group into which all the bridge nodes on the ring are aggregated, is prepared and registered on each of the bridge nodes. Then, as shown in FIG. 2, in the case where the RPR MAC address corresponding to the destination node MAC address of the frame is not yet learned (in a case where the RPR MAC address mapping thereto is not yet registered in the table), it is used for transmitting the frame to all the bridge nodes.

If done in this way, only the bridge nodes on the ring can receive the frame. At this time also, the station node just lets the multicast frame pass through. Even if the station node executes a process of discarding the multicast frame, the station node can deal with also the encapsulated frame, and therefore any problem does not arise in the discarding process (see FIG. 2).

As described above, according to the invention, it is possible perform the communications between all the bridge nodes and station nodes on the RPR without adding any change to the packet format in the present rules, and also to provide the MAC bridging system having a small load in communications.

EMBODIMENT

Figure 3:
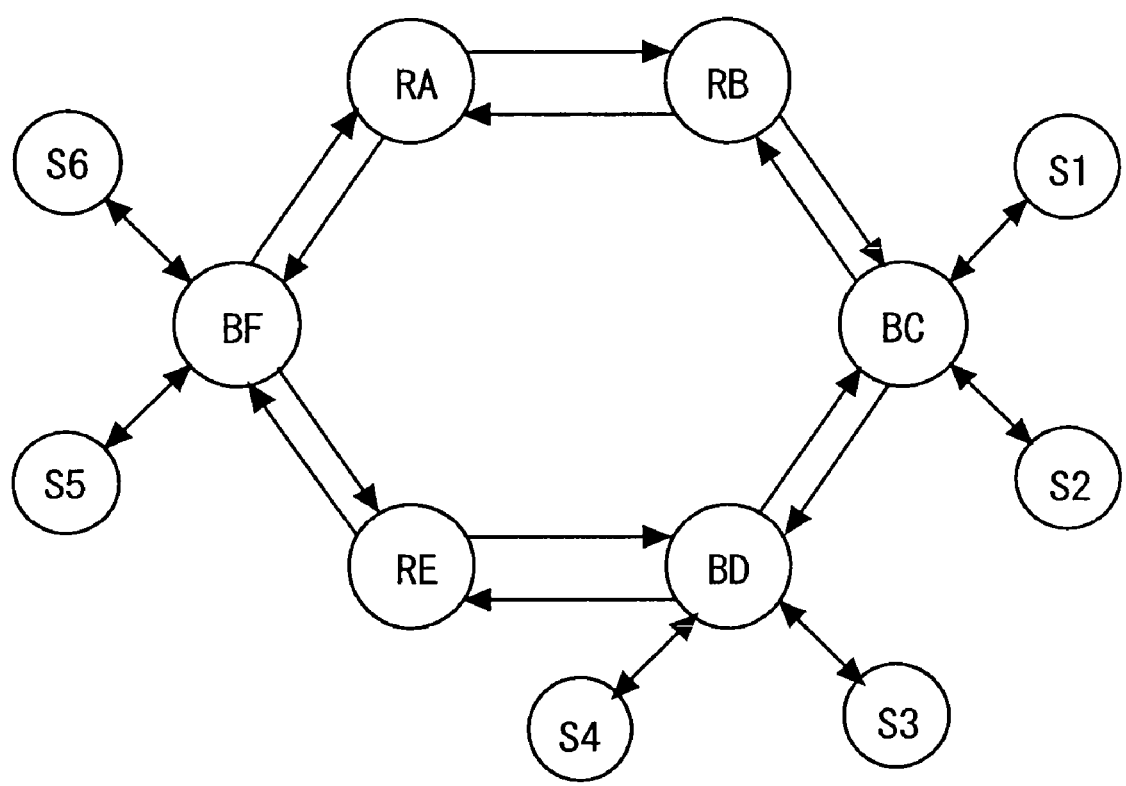
FIG. 3 is a diagram showing an IP network model by way of an embodiment of the invention.

FIG. 3 is a diagram showing an IP network model by way of an embodiment of the invention. FIG. 4 is an IP/MAC address table on each device (the RPR node) in the embodiment. FIG. 5 is a diagram showing an example of the topology map table retained on each RPR node shown in FIG. 3.

<Outline>

At first, an outline of the network system in the embodiment will be explained. In FIG. 3, devices RA, RB, BC, BD, RE, BF are RPR nodes, and the RPR nodes are constructed of station nodes RA, RB, RE having a function as a router, and of bridge nodes BC, BC, BF having a function as a bridge. These six pieces of RPR nodes configure one ring network. Each of these RPR nodes, through transferring and receiving a topology discovery packet, has already structured the topology map table shown in the table in FIG. 5 inwardly of the device.

S1-S6 shown in FIG. 3 are stations residing outside (off the ring) the RPRT network and capable of transmitting and receiving the IP frame. These stations S1-S6 have already acquired the IP addresses of all the devices including the RPR network. The respective device MAC addresses corresponding to the IP addresses are not yet learned. Further, each of the RPR nodes does not yet learn the MAC address of each station off the ring.

Moreover, the all the nodes have already known the MAC address (MAC) to the group which the bridge nodes BC, BD, BF on the RPR network belong to, and only the respective bridge bodes BC, BD, BF can execute a process of receiving this.

OPERATIONAL EXAMPLE

Next, an operational example of the network system in the embodiment will be described. In the network illustrated in FIG. 3, the operational example in data transmission/receipt (A) and (B) shown as below, will be explained.

(A) Data Transmission to Station S6 from Station S1

FIG. 6 is an explanatory diagram of an ARP frame format between stations S1 and S6. FIG. 7 is an explanatory diagram of a format of an IP data packet transferred and received between the stations S1 and S6.

In the case of transmitting the IP data frame to the station S6 from the station S1, to begin with, the station S1 is required to know the MAC address of the station S6. Therefore, an ARP (Address Resolution Protocol) packet is sent to the network, and the MAC address of the station S6 is acquired. A frame format of the ARP packet is shown in FIG. 6.

A destination address of the frame (the ARP frame: see FIG. 6A) transmitted from the station S1 is broadcast (DA=BC). Therefore, a transparent transmission according to the rules is conducted. Namely, the bridge node BC, which is connected to the station S1 and receives the ARP frame, sets a RPR header, a HEC and a recalculated FCS in the ARP frame, thereby translating the ARP frame (effecting a transparent translation) into a RPR-based format (see FIG. 6B).

Thereafter, the bridge node BC, the destination address of the ARP frame being the broadcast, the ARP frame is transmitted toward the RPR ring round an inner circle and an outer circle in both ways so that the ARP is received by all the nodes on the RPR.

At this time, the bridge node BC, if not learning about the RPR node accommodating the station S6, sends the ARP frame having the format shown in FIG. 6A also to the station S2.

Further, the bridge node BC, with a trigger that the frame is received from the station S1, learns that the station S1 is connected as a subordinate to the self-device. Namely, the bridge node BC registers a mapping relationship between the MAC address (MS1) of the station S1 and the MAC address (MBC) of the self-device (the bridge node BC) in the MAC address translation table.

A destination address of the ARP frame (see FIG. 6B) sent to the RPR network (the RPR ring) is the broadcast. Therefore, all the nodes on the ring receive it. At this time, each of the station nodes RA, RB, RE receives and analyzes the ARP frame. Each of the station nodes RA, RB, RE, since a mapping IP address for obtaining the MAC address is different from a self IP address, does not respond to the ARP packet.

By contrast with this, each of the bridge nodes BD, BF, upon receiving the ARP frame, because of the destination address (RPR MAC DA) being the broadcast (which means that it is not the MAC address of the bridge node), judges that the ARP frame is not encapsulated. In this case, each of the bridge nodes BD, BF deassembles the ARP frame back to the original format (FIG. 6A) and thus transmits it to the subordinate station (it operates as being transparent).

Eventually, only the station S6 can respond to the ARP frame (for the reason that the mapping IP address set in the ARP frame is the IP address of the station S6). The station S6, upon receiving the ARP frame, sends an ARP response frame mapping thereto in a format shown in FIG. 6C to the bridge node BF.

The bridge node BF checks a destination node (destination) address (=MS1) of the ARP frame received from the station S6 and, this not existing in the topology map table (see FIG. 5), judges that the MAC address is a MAC address of a station off the ring.

Further, the bridge node BF does not yet learn about where the bridge node to which the station (that is herein the station S6) specified by the destination address is connected, is located. Hence, the bridge node BF assembles a RPR frame into which the ARP frame from the station S1 is encapsulated in FIG. 6D by use of a multicast address (=MC) set for the bridge group, and sends it onto the RPR ring. A RPR destination address of the RPR frame is the multicast address. Therefore, the RPR frame is received only by each of the bridge nodes BC, BD on the RPR ring.

Each of the bridge nodes BC, BD, the destination address of the RPR frame being the multicast address (the frame destination being the bridge node), judges that the MAC frame (the EMAC frame) is encapsulated into the RPR frame, then decapsulates it to extract a body frame (the ARP frame) and sends it to the devices (the respective stations off the ring) subordinate to the node itself.

At this time, each of the bridge nodes BC, BD learns that the station S6 is connected subordinately to the bridge node BF. Namely, each of the bridge nodes BC, BD registers in the translation table a source address (SA=MBF) of the RPR frame and a source address (SA=MS6) of the MAC frame (the ARP frame) encapsulated into this in a way that makes them corresponding to each other.

Then, the ARP frame sent to the stations (which are herein the stations S1, S2, S3, S4) off the ring, is received only by the station S1. Thus, the station S1 can acquire the MAC address of the station S6.

Figure 7A:
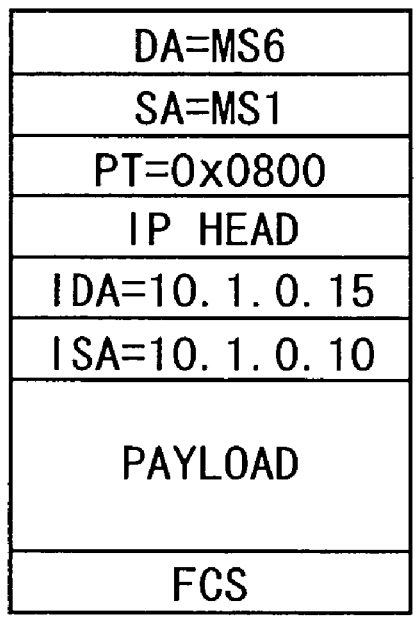
FIG. 7 is an explanatory diagram of a format of an IP data packet (an IP frame) transferred and received between the stations in the embodiment.
Figure 7B:
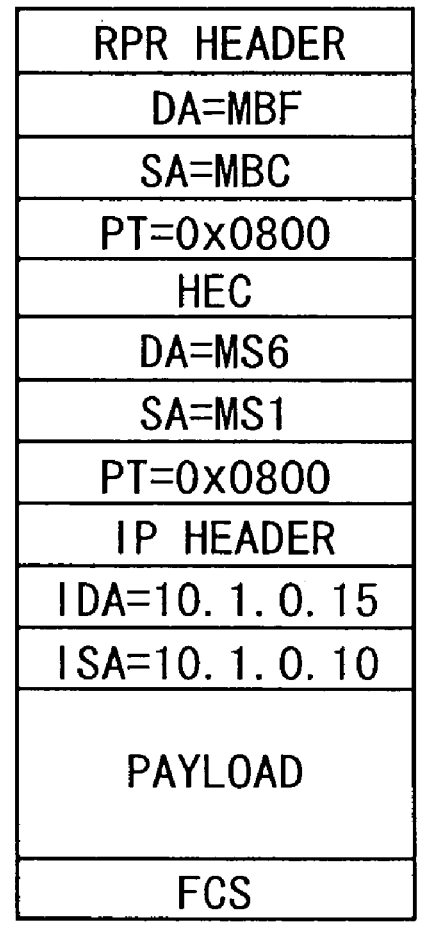

Next, the station S1 transmits an IP data packet (an IP frame) as an essential transmission object to the bridge node BC in a frame format shown in FIG. 7A.

The bridge node BC receives the IP frame from the station S1 and can, because of its destination address being the MAC address of the station S6 (which is not registered in the topology map table), recognize that the destination of the IP frame is not the node on the RPR ring but the station S6 subordinate to the bridge node BF that has been already learned (already registered in the translation table).

Therefore, the bridge node BC assembles a RPR frame (see FIG. 7B) into which the IP frame from the station S1 has been encapsulated with a RPR header designating the MAC address of the bridge node BF to a destination address, and sends it onto the RPR ring.

Only the bridge node BF receives the RPR frame. The bridge node BF recognizes, as the destination is not designated to the broadcast, that the IP frame has been encapsulated. Accordingly, the bridge node BF decapsulates it and transmits the body IP frame to the station S6. The transmission and the receipt of the data (the IP frame) between the station S1 and the station S6 are thereby completed.

Note that the bridge node BF, when receiving the RPR frame, can learn (can register in the translation table) from the its source MAC address and the source MAC address of the encapsulated MAC frame that the station S1 is connected subordinately to the bridge node BC. Therefore, the frame transmission in a reversed direction, i.e., from the station S6 to the station S1 can be done from this onwards in the same way as the IP frame has been sent to the station S6 from the station S1.

(B) Data Transmission from Station Node RA to Station S3

FIG. 8 is an explanatory diagram of an ARP frame format between a station node RA and the station S3. FIG. 9 is an explanatory diagram of a format of the IP data packet between the station node RA and the station S3.

In the case of transmitting the frame to the station S3 from the router node RA, as in the case (A), before the router node RA sends the IP frame to the station S3, there is required a procedure of knowing the MAC address of the station S3 trough the ARP packet. FIG. 8 shows a frame format related to a RA→S3 ARP.

A destination MAC address of the ARP frame transmitted from the router node RA is a broadcast address (see FIG. 8A). Therefore, each node on the ring can receive the ARP frame. At this time, each of the station nodes RB, RE receives and analyzes the ARP frame but does not respond to this because of not being its own IP address.

On the other hand, each of the bridge nodes BC, BD, BF, when receiving the ARP frame, judges that this is not encapsulated, because the destination MAC address is the broadcast address, then performs the transparent translation and transmits it in a format shown in FIG. 8B to the subordinate station.

Eventually, the station S3 receives the ARP frame. The station S3 sends to the bridge node BD an ARP response frame (having a format shown in FIG. 8C) to the ARP frame.

The bridge node BD checks a destination MAC address of the ARP response frame. At this time, the destination MAC address is given such as "DA=MRA" and is registered in the topology map table. Hence, the bridge node BD can recognize that the destination is addressed to the node on the ring. Therefore, the bridge node effects the transparent translation into the RPR form a without encapsulating and sends it (see FIG. 8D).

A destination f the RPR frame (the ARP response frame) is a station node RA. Accordingly, only the station node RA can receive the RPR frame From the RPR frame, the router node RA learns that the station S3 exists subordinately to the bridge BD, and completes an acquisition of the MAC address of the station S3.

Next, the router node RA sends the IP data packet (the IP frame) as an essential transmission object to the station S3 as it is addressed thereto. Namely, the router node RA assembles a RPR frame (see FIG. 9A) into which the IP frame is encapsulated, and sends it. A destination MAC address of the RPR frame designates the bridge node BD (DA=MBD). Therefore, the bridge node BD receives the RPR frame.

The bridge node BD decapsulates the RPR frame and transmits a body frame (the IP frame) to the station S3. The station S3 receives the IP frame from the bridge node BD. Thus, the transmission and receipt of the data (the IP frame) between the RA and S3 are completed.

In a case where the station S3 sends the IP data packet (the IP frame) to the router node RA, the IP frame having the format shown in FIG. 9(*b*) is sent to the bridge node BD.

The bridge node BD assembles the RPR frame (see FIG. 9C) into which the IP frame from the station S3 has been transparent-translated, and transmits it to the station node RA. The router node RA can thereby receive the IP frame from the station S3.

Two data transmission patterns in the network illustrated in FIG. 3 have been shown so far. As a matter of course, also between other stations, bridges and routers, if the frame is assembled based on the rule of the invention, the frame can be transmitted and received within the IP network by deassembling back to the original frame outside in accordance with the present specified format on the RPR.

<Structure of Bridge Node>

Figure 10:
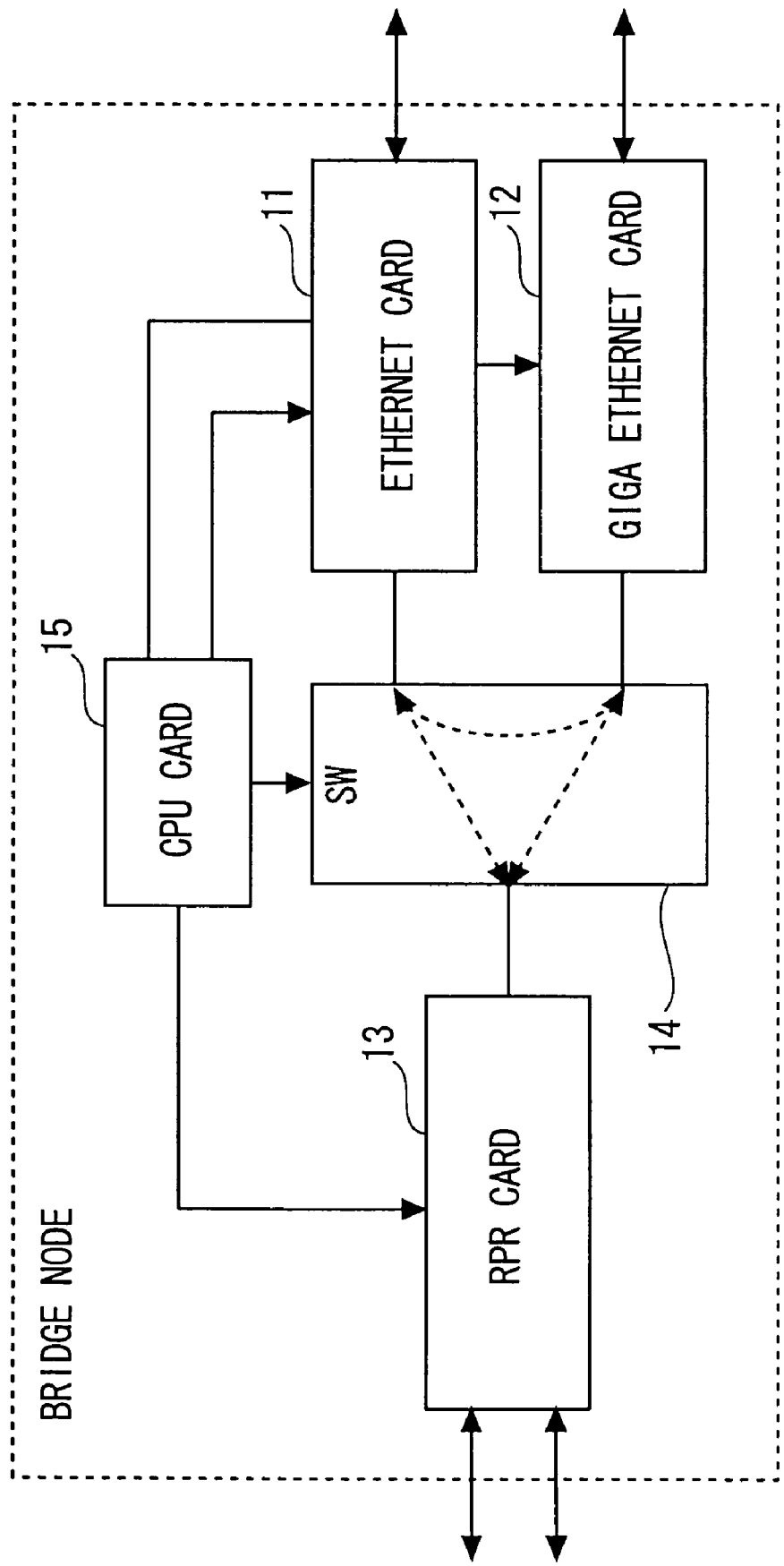
FIG. 10 is a diagram showing an example of a structure of a bridge node.
Figure 11:
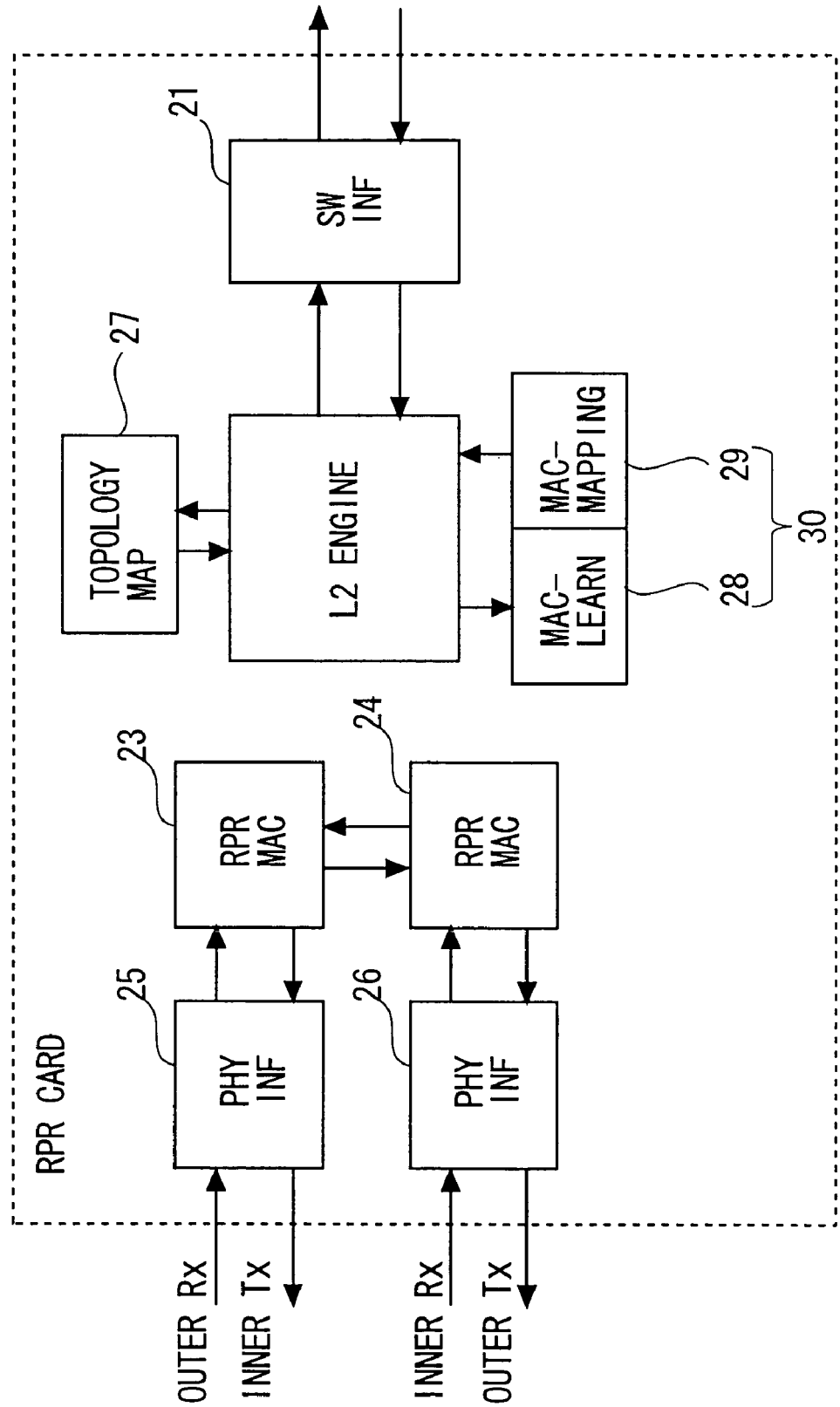
FIG. 11 is a block diagram showing an example of a structure of a RPR card shown in FIG. 10.

Next, an example of a structure of the bridge node will be explained. FIG. 10 is a diagram showing the example of the architecture of the bridge node, and FIG. 11 is a block diagram showing a structure of a RPR card shown in FIG. 10. FIG. 12 is a diagram showing an example of a data structure of a learning table/MAC address mapping table.

A bridge node 10 illustrated in FIG. 10 can be applied as each of the bridge nodes BC, BD, BF in FIG. 3. The bridge node 10 includes an Ethernet card (Ethernet Card) 11 connected to the stations off the ring via an Ethernet circuit, a Giga Ethernet card (Giga Ethernet Card) 12 connected to the stations off the ring via a Giga Ethernet circuit, a RPR card (RPR Card) 13 connected to the RPR ring, a switch (SW) 14, connected to the cards 11 through 13, for transferring and receiving the MAC frame between the cards by its switching operation, and a CPU card (CPU Card) 15 for controlling the cards 11 through 13 and the switch 14.

Each of the RPR card 13, the Ethernet card 11 and the Giga Ethernet card 12 is a card for processing the MAC frame at an Interface speed and on a protocol. The CPU card 15 performs a role of managing the cards 11 through 13 and controlling the switch 14 as an interface between the cards.

Upon an input of the MAC frame to a certain card among the cards 11 through 13, the card searches through a learning table with the destination MAC address of the MAC frame being used as a key, and, if already learned, forwards it to other relevant card. At this time, if not learned, it floods the MAC frame to all other cards.

Thus, the learning tables called "MACLEARN" exist in the respective cards 11 through 13, and are managed by the CPU card 15 to have the same learning content.

Further, the individual cards 11 through 13 are managed based on port numbers, and the learning table retains the learning content (which is a mapping relationship between the port numbers and the MAC addresses of the subordinate devices) in a form that shows which MAC address the device connected subordinately to the port number has.

The RPR card 13 is a card for executing a protocol process according to the invention. As shown in FIG. 11, the RPR card 13 includes a switch interface (SW-INF) 21 connected to the switch 14 (FIG. 10), an L2 engine (L2 Engine) 22 connected to the switch interface 21, RPR MAC modules (constructed of LSIs) 23, 24 each connected to the L2 engine 22, and physical interfaces (PHY-INF) 25, 26 connected respectively to the RPR MAC modules 23, 24.

Further, a topology map table 27, a learning table (MAClearn table) 28 and a MAC address mapping table 29 are connected to the L2 engine 22, and are referred to and/or updated depending on a process by the L2 engine 22.

The RPR is of dual rings, and hence there are prepared the two physical interfaces 23, 24 accommodating respectively outer and inner communication lines. The physical interface 25 accommodates the outer line for receiving the frame and an inner line for transmitting the frame, while the physical inter face 26 accommodates the inner line for receiving the frame and the outer line for transmitting the frame.

The L2 engine (L2_Engine) 23 executes processes including the protocol process according to the invention. The L2 engine 23 selects one of the RPR MAC modules 23, 24 in accordance with the destination MAC address of the frame that should be forwarded to the RPR ring, and gives the frame to the selected RPR MAC module. It is thereby automatically determined which side (outer/inner: Outer/Inner) of the dual rings the frame is forwarded to.

Each of the RPR MAC modules 23, 24 translates the MAC address into a final RPR format. Herein, the transparent translation and the encapsulation are carried out.

Three categories of main tables exist in the L2 engine 22. The first table is the topology map table 27 necessary for the RPR protocol process. The topology map table 27 has the data structure shown in FIG. 5, and manages the MAC addresses, TTLs, etc. of the respective nodes on the ring.

The second table is the learning table (MAC learning table) 28 that corresponds to the learning table explained in FIG. 10. The learning table 28 is registered with a mapping relationship between the port number retained the RPR card 10 and the MAC address of the device connected to a port having the port number.

The third table is the MAC address mapping table 29. The MAC address mapping table 29 is registered with a mapping relationship between the MAC addresses of the stations subordinates to the node on the ring on the RPR side and the MAC addresses of the nodes themselves. The MAC address mapping table 29 corresponds to the translation table shown in FIG. 1.

The MAC learning table 28 can be merged with the MAC address mapping table 29. FIG. 12 is a diagram showing an example of a data structure of a table (MAC learn/MAC mapping table) 30 into which the table 28 and the table 29 are merged.

As sown in FIG. 12, the table 30 can be registered per node on the ring by learning with records each consisting of a node name (a device name), a MAC address of the node, a name (a device name) of the station off the ring that is connected to the node, a MAC address of the station and a port number corresponding to the station.

The RPR card 13 shown in FIG. 11 is preinstalled also into each station node on the ring.

<Processing Flow>

Figure 13:
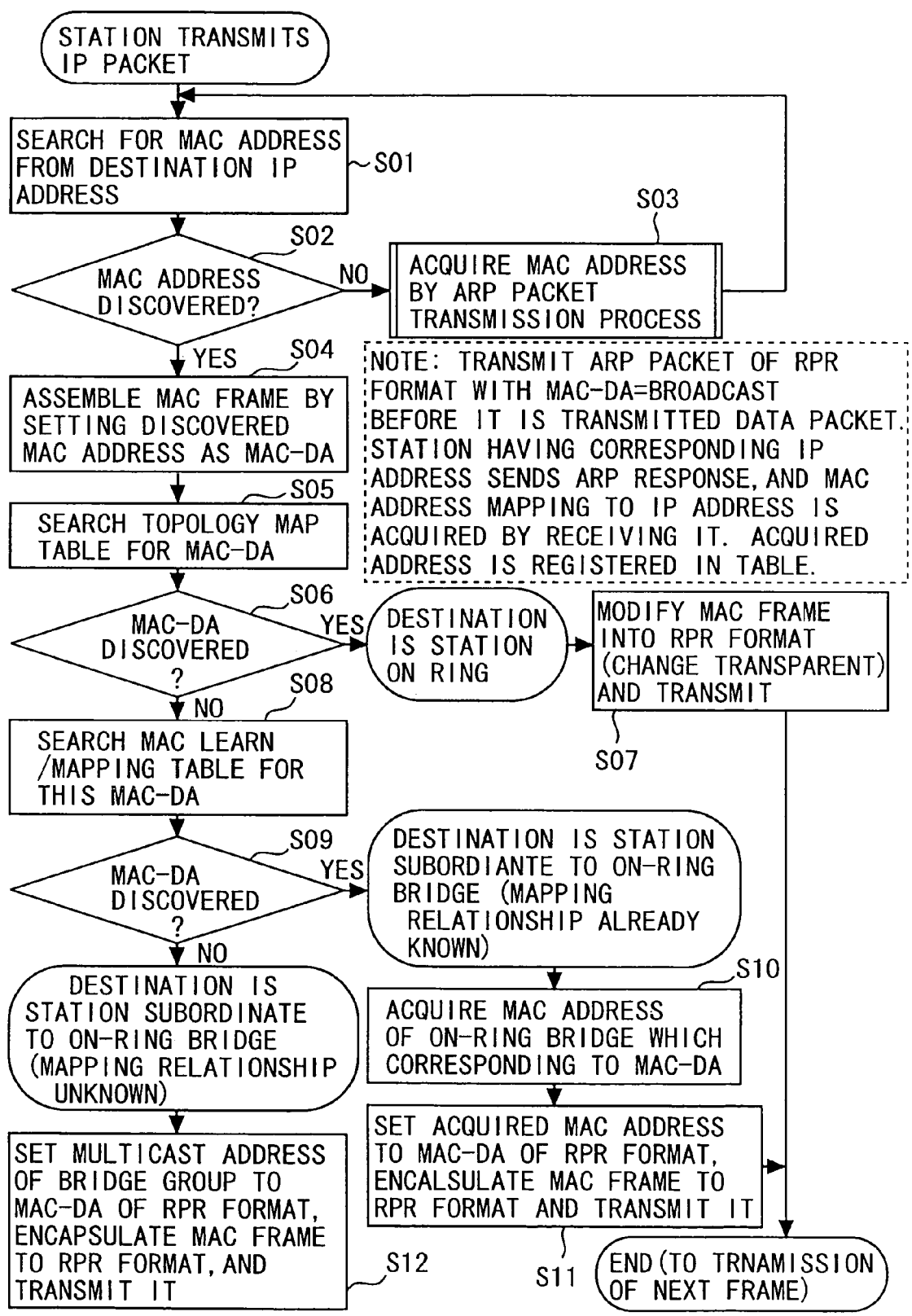
FIG. 13 is a flowchart showing a RPR MAC frame transmitting process by the station node.
Figure 14:
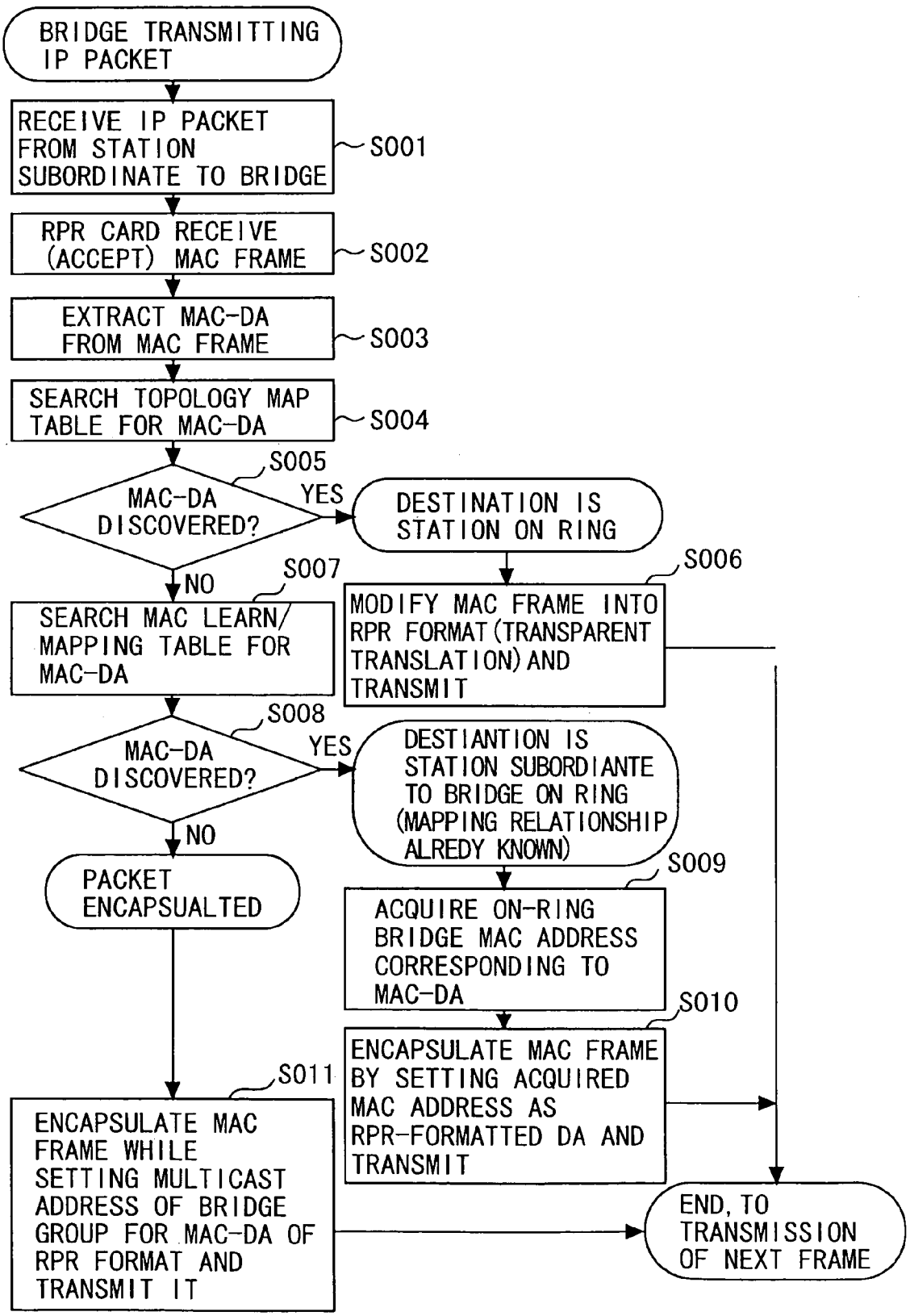
FIG. 14 is a flowchart showing a RPR MAC frame transmitting process by the bridge node.
Figure 15:
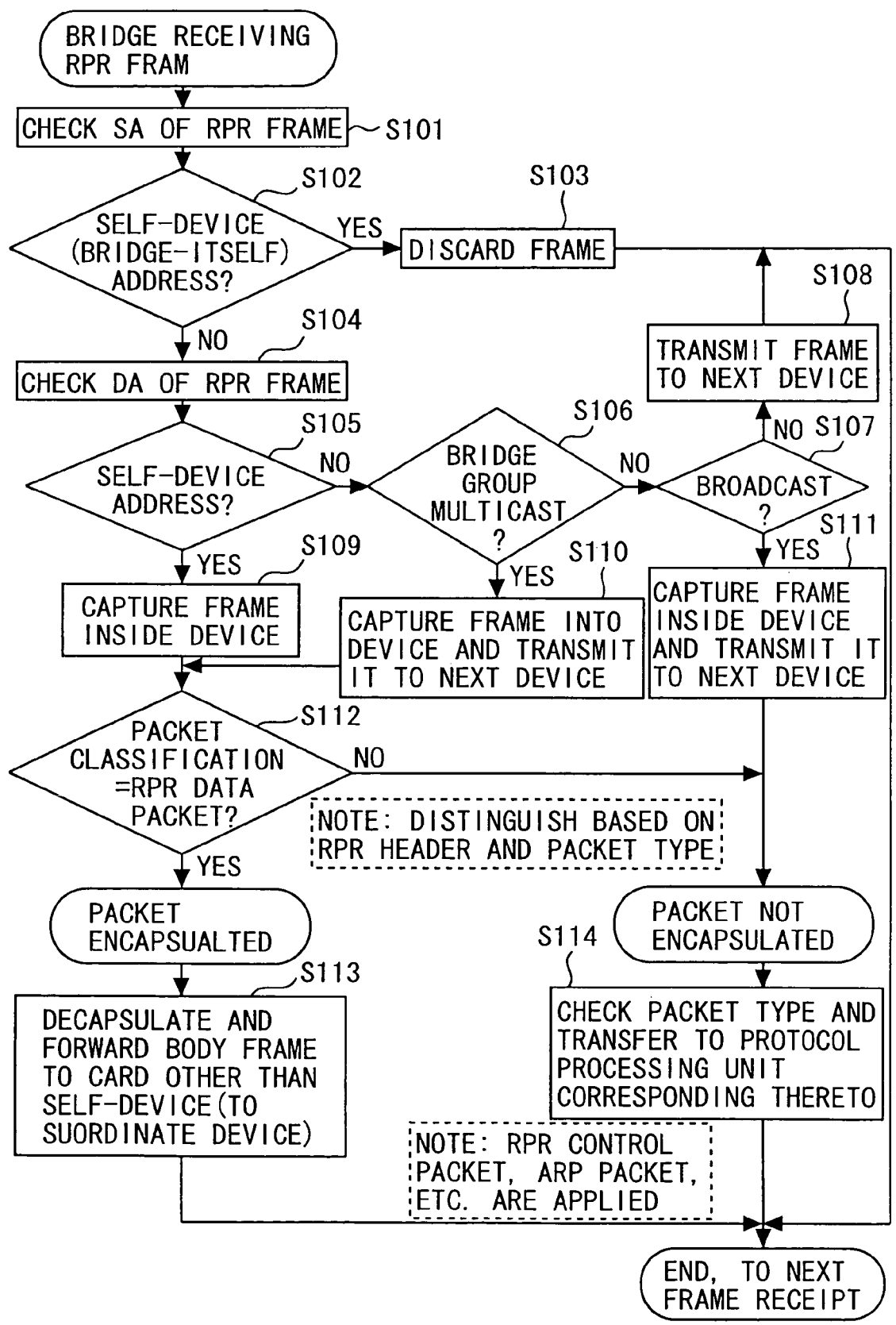
FIG. 15 is a flowchart showing a RPR MAC frame receiving process by the bridge node.
Figure 16:
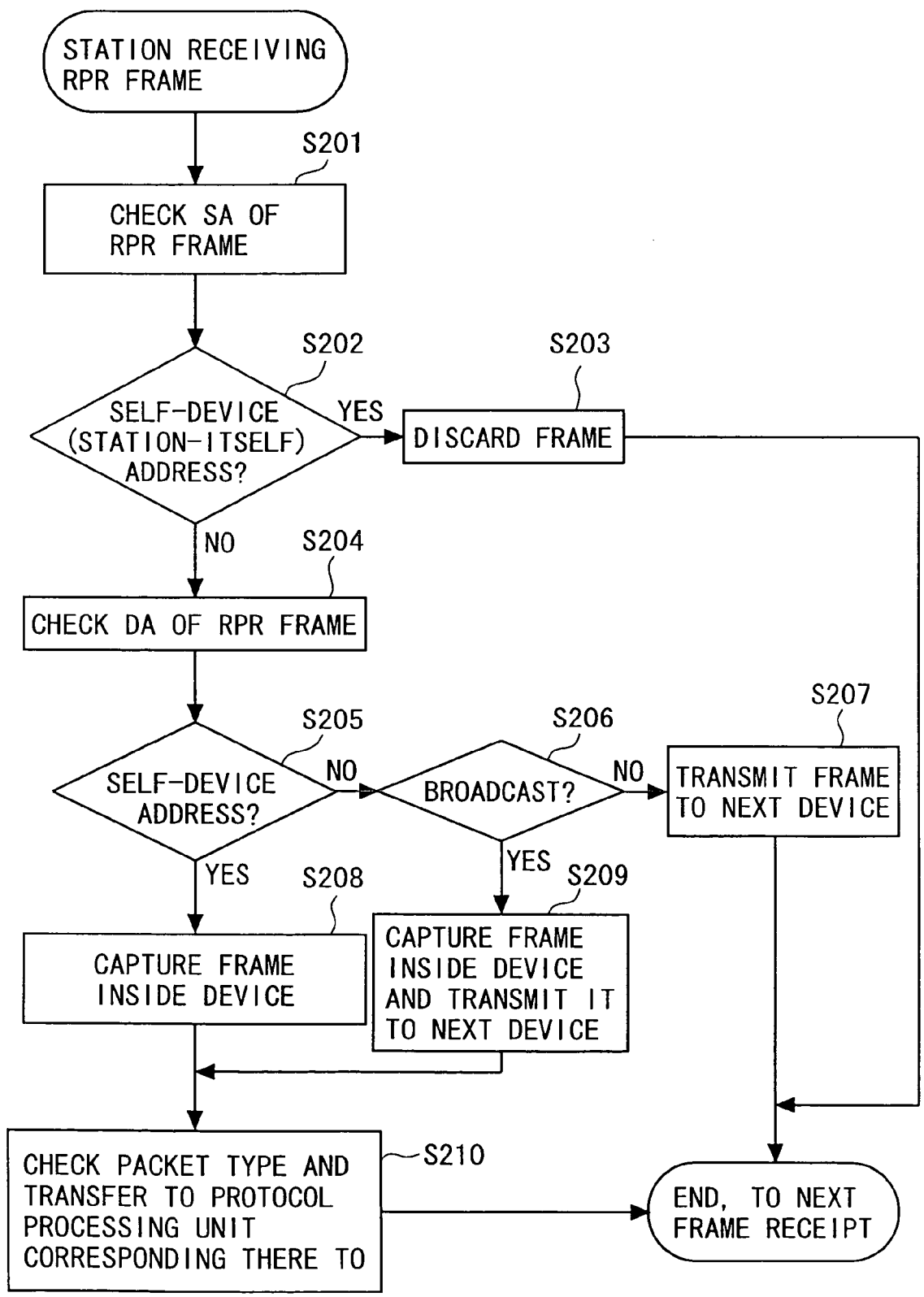
FIG. 16 is a flowchart showing a RPR MAC frame receiving process by the station node.

Next, processes of the station off the RPR ring, the station on the RPR ring and the bridge node, will be explained. FIG. 13 is a flowchart showing a RPR MAC frame transmitting process by the station node, FIG. 14 is a flowchart showing a RPR MAC frame transmitting process by the bridge node, FIG. 15 is a flowchart showing a RPR MAC frame receiving process by the bridge node, and FIG. 16 is a flowchart showing a RPR MAC frame receiving process by the station node.

These processes are executed chiefly by the RPR cards preinstalled into the station nodes and the bridge nodes. The respective processes will hereinafter be described.

<<Frame Transmitting Process by Station Node>>

The station node, in the case of transmitting the IP data packet to a predetermined party (which is, e.g., an arbitrary station off the ring), executes the process shown in FIG. 3.

At first, the station node searches for a MAC address corresponding to a destination node (destination) IP address (step S01), and judges whether the MAC address is discovered (known) or not (step S02).

At this time, in case the MAC address is discovered (S02: Y), the processing proceeds to step S04. Whereas if not (S02: N), the station node acquires the MAC address mapping thereto by the ARP packet transmitting process, and returns the processing to step S01.

In step S04, the station node assembles a MAC frame (including the IP data packet) in which the discovered MAC address is set in a destination MAC address.

Next, the station node searches for a destination MAC address of the MAC frame by referring to the topology map table (see FIG. 5) (step S05), and judges whether or not the destination MAC address is discovered (registered in) from the topology map table (step S06).

At this time, in case the destination MAC address is discovered (S06: Y), the transmitting destination is the station on the ring, and therefore the station node modifies the MAC frame into a RPR format (effects the transparent translation), and forwards it onto the RPR ring (step S07). Upon an end of step S07, the transmitting process is finished.

While on the other hand, in case the destination MAC address is not discovered in step S06 (S06: N), the station node searches (Search) the MAClearn/MAC mapping table (retained on the station node) for the destination MAC address (step S08), and judges whether the destination MAC address is discovered or not (step S09).

At this time, in case the destination MAC address is discovered (S09: Y), the destination is the station off the ring that is subordinate to the bridge node, and the MAC address of the bridge node to which the station is connected, is known (which has already been registered in the MAClearn/MAC mapping table). Therefore, the station node acquires the MAC address of the bridge node that is set corresponding to the destination MAC address from the MAClearn/MAC mapping table (step S10).

Subsequently, the station node encapsulates, in the RPR format, the MAC frame assembled in step S04, and transmits it (step S11). At this time, the station node sets the MAC address of the bridge node that has been obtained in step S10 as a destination MAC address in the RPR format. Upon finishing the process in step S11, the transmitting process is terminated.

In case the destination MAC address is not discovered in step S09 (S09: N), the destination is a station off the ring that is subordinate to the bridge node, however, a state is that the MAC address of the bridge node to which the station is connected, is unknown (not yet registered in the MAClearn/MAC mapping table). Therefore, the station node encapsulates the MAC frame in a way that sets the multicast address to the bridge group as a destination MAC address in the RPR format, and sends it (step S12). Upon finishing the process in step S12, the transmitting process is terminated.

<<Frame Transmitting Process by Bridge Node>>

Next, a frame transmitting process by each bridge node on the RPR ring will be explained. As shown in FIG. 14, the bridge node 10 (FIG. 10) receives through the Ethernet card 11 or the Giga Ethernet card 12 the MAC frame (including, e.g., the IP data packet) from the station subordinate to the node 10 itself (S001). The received MAC frame, in the case of its being sent to the RPR ring, forwarded to the RPR card 13 via the switch 14 (step S002).

Thereupon, in the RPR card 13, the L2 engine 22 (FIG. 11) receives the MAC frame via the switch interface 21, and extracts a destination MAC address out of the MAC frame (step S003).

Next, the L2 engine 22 searches through the topology map table 27 as to whether the destination MAC address is registered therein or not (step S004), and judges whether the destination MAC address is discovered or not (step S005).

At this time, in case the destination MAC address is discovered (S005; Y), the transmitting destination is a station on the ring, and hence the L2 engine 22 gives the MAC frame to the corresponding RPR MAC module in accordance with the contents stored in the topology map table. The RPR MAC module, when receiving the MAC frame from the L2 engine 22, modifies the MAC frame into the RPR format (the transparent translation).

The translated MAC frame (a RMAC frame) is sent onto the RPR ring from the corresponding physical interface (step S006). Upon an end of step S006, the transmitting process is finished.

While on the other hand, in step S005, in case the destination MAC address is not discovered (S005; N), the L2 engine 22 searches the MAClearn/MAC mapping table 30 for the destination MAC address (step S007), and judges whether the destination MAC address is discovered or not (step S008).

A this time, in case the destination MAC address is discovered (S008; Y), the destination is a station off the ring that is subordinate to the bridge node, and the MAC address of the bridge node to which the station is connected, is known (which has already been registered in the MAClearn/MAC mapping table 30). Therefore, the Le engine 22 acquires the MAC address of the bridge node that is set corresponding to the destination MAC address from the MAClearn/MAC mapping table 30 (step S009).

Subsequently, the L2 engine 22 forwards the MAC frame together with the MAC address obtained from the table 30 to the corresponding RPR MAC module in accordance with the contents in the topology map table 27.

The RPR MAC module encapsulates, upon receiving the MAC frame and the MAC address from the L2 engine 22, the MAC frame into the RMAC frame, and sets the MAC address in a destination MAC address of the RMAC frame.

Thereafter, the RMAC frame is sent onto the RPR ring via the corresponding physical interface (step S010). Upon finishing step S010, the transmitting process is terminated.

In step S008, in case the destination MAC address is not discovered (S008; N), the destination is a station off the ring that is subordinate to the bridge node, however, a state is that the MAC address of the bridge node to which the station is connected, is unknown (not yet registered in the MAClearn/ MAC mapping table 30). Therefore, the L2 engine 22 forwards the MAC frame and a multicast address (retained previously) to the bridge node group to the corresponding RPR MAC module in accordance with the contents of the topology map table.

The RPR MAC module, upon receiving the MAC frame and the multicast address from the L2 engine, encapsulates the MAC frame into the RMAC frame and sets the multicast address in a destination MAC address of the RMAC frame. Thereafter, the RPR frame is sent onto the RPR ring via the corresponding physical interface (step S011). Upon finishing step S011, the transmitting process comes to an end.

<<Frame Receiving Process by Bridge Node>>

Next, a frame receiving process by the bridge node will be described. As shown in FIG. 15, the bridge node 10 (FIG. 10) receives through the RPR card 13 the frame (RMAC frame) from the RPR ring.

In the RPR card 13, a source MAC address (SA) of the RPR frame (the RMAC frame) is checked (step S101), and it is judged whether the source MAC address is a self-device address or not (step S102). At this time, in case the source MAC address is the self-device address (S102; Y), the frame is discarded (step S103), and the receiving process is finished.

Whereas if the source MAC address is not the self-device address (S102; N), a destination MAC address of the RPR frame (the RMAC frame) is checked (step S104), and it is judged whether the destination MAC address is the self-device address or not (step S105).

At this time, in case the destination MAC address is the self-device address (S105; Y), the processing proceeds to step S109, and in case it is not (S105; N), the processing proceeds to step S106.

In step S106, it is judged whether or not the destination MAC address is the multicast address to the bridge group, and the processing proceeds to step S110 in case it is the multicast address (S106; Y) and proceeds to step S107 in case it is not (S106; N).

In step S107, it is whether or not the destination MAC address is the multicast address to the bridge group, in case it is the broadcast address (S107; Y), the processing proceeds to step S11l, in case it is not (S107; N), the RMAC frame is transmitted to a next device (neighboring node) (step S108), and the receiving process is finished.

In step S109, the RMAC frame is captured in the device (the bridge node), and the processing proceeds to step S112.

In step S110, the RMAC frame is captured in the device (the bridge node) and also transmitted to the next device (the neighboring node), and the processing proceeds to step S112.

In step S111, the RMAC frame is captured in the device (the bridge node) and also transmitted to the next device (the neighboring node), and, assuming that the packet (the MAC frame) is not encapsulated, the processing proceeds to step S114.

Figure 17A:
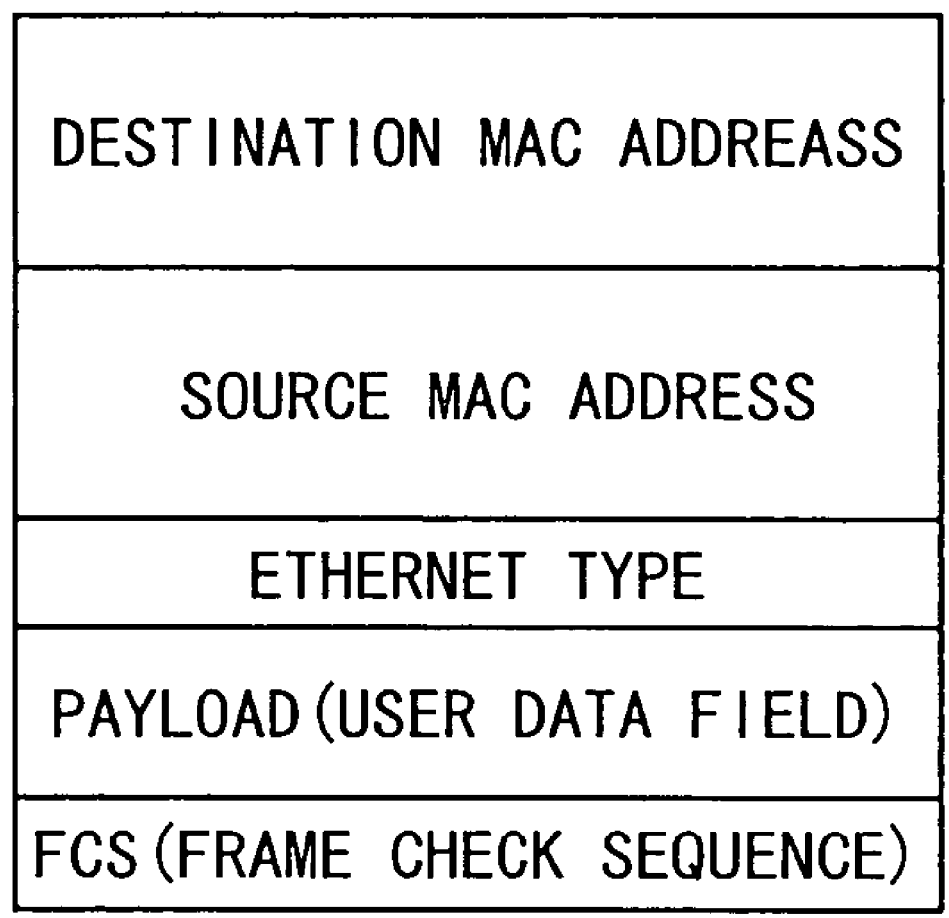
FIG. 17 is an explanatory diagram of formats of the EMAC frame and the RMAC frame.
Figure 18:
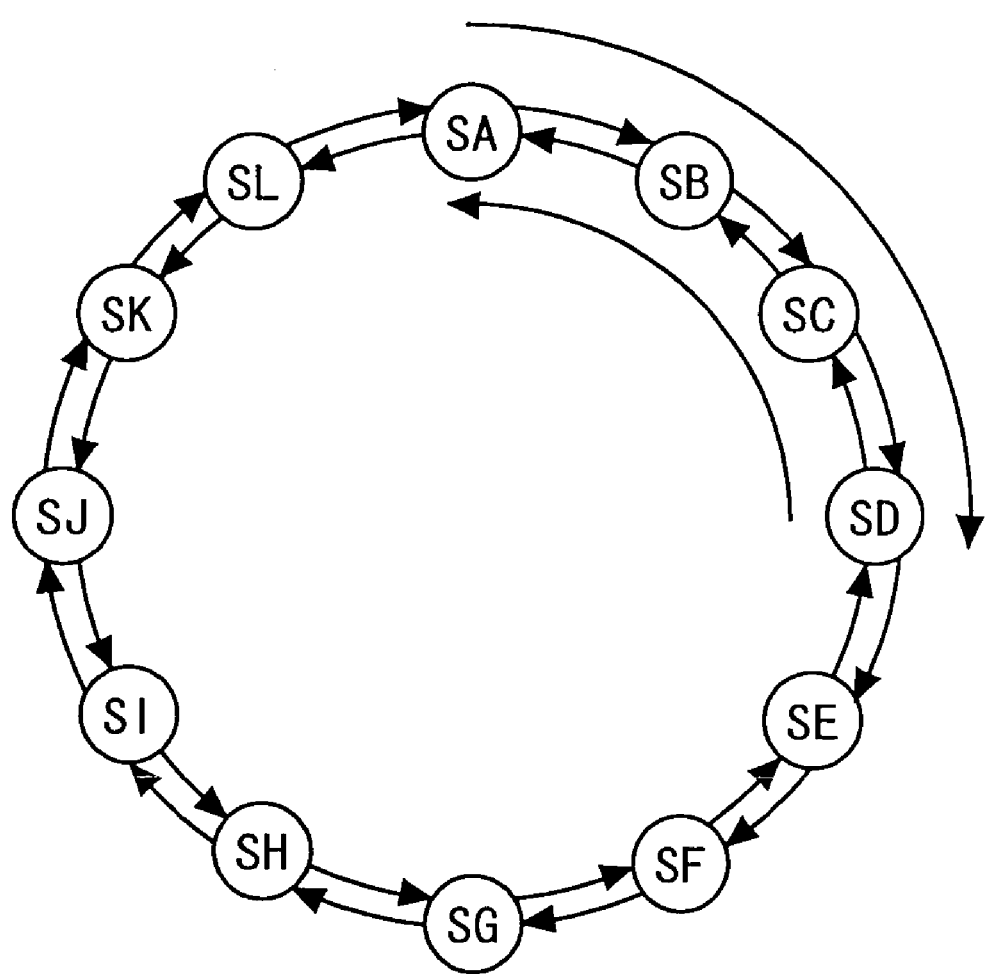
FIG. 18 is a diagram showing an example of a RPR network.
Figure 19:
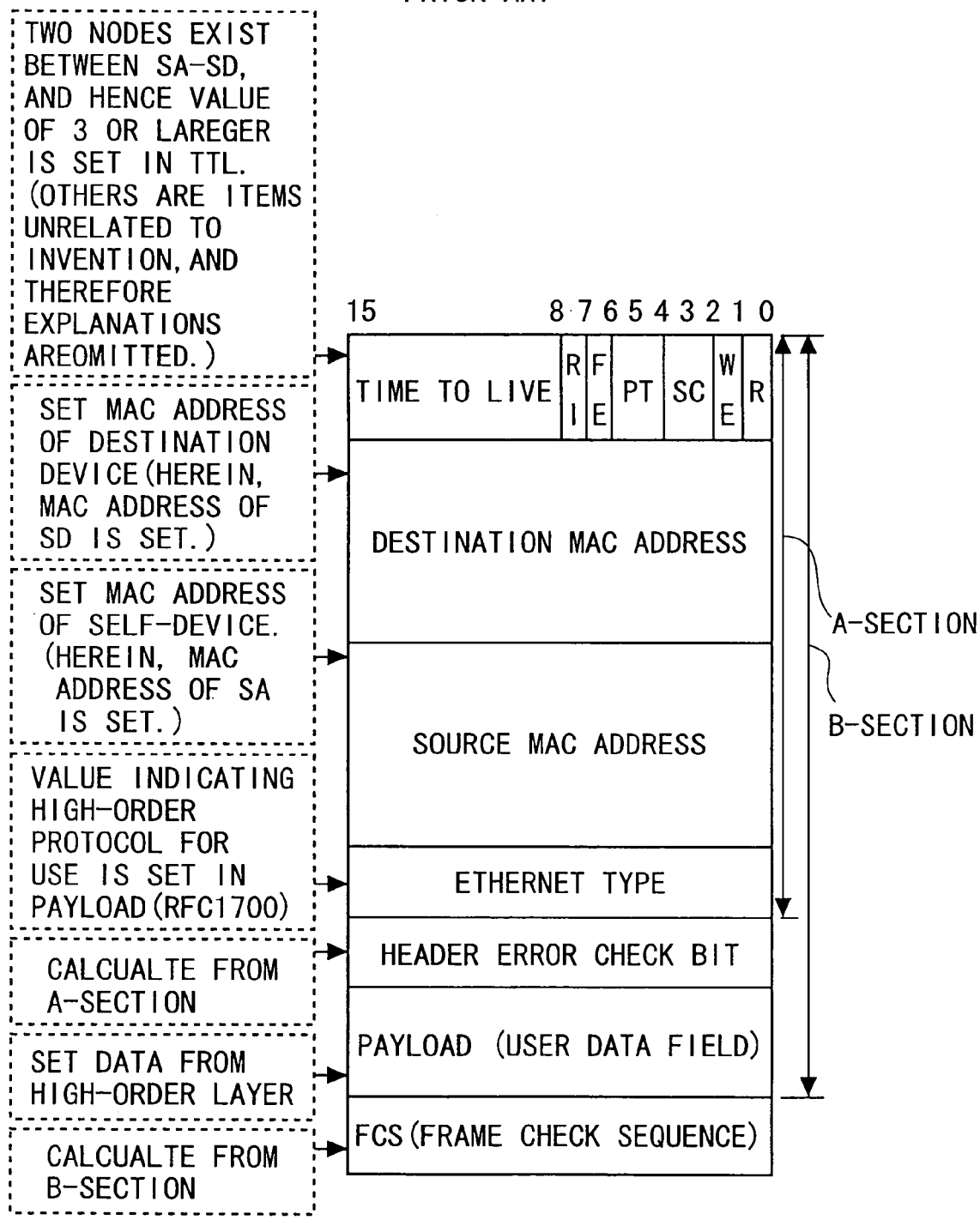
FIG. 19 is an explanatory diagram of assembling the RMAC frame.
Figure 22:
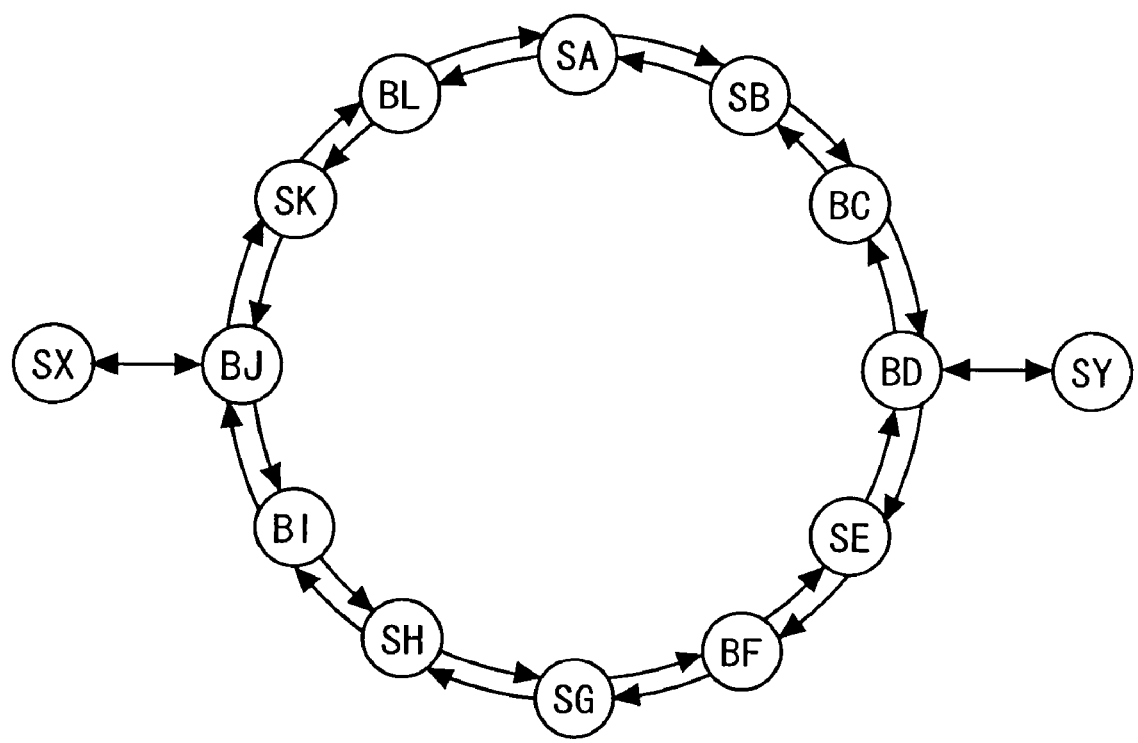
FIG. 22 is a diagram showing an example of the RPR network in which the station nodes and the bridge nodes exist in mixture.

In a step S112, it is judged whether a PT ((packet type) (packet classification): see FIG. 17) in the RPR header of the RMAC frame is "data packet (11)" or not. In case the packet type is the data packet, it is assumed that the packet (MAC frame) has been encapsulated into the RMAC frame, and the processing proceeds to step S113.

In a step S113, the RMAC frame is decapsulated, the body frame (the MAC frame) is forwarded to the card (the Ethernet card of Giga Ethernet card) via the switch 14 in accordance with the destination MAC address and further forwarded to the subordinate device (the station) from the card. Upon an end of step S113, the receiving process is finished.

In step S114, the packet type (other than the data packet) in the RPR header of the RMAC frame is checked, and the packet (the user data field) in the RMAC frame is transferred to the protocol processing unit corresponding to the packet type. Upon finishing step S114, the receiving process is terminated.

<<Frame Receiving Process by Station Node>>

Next, a frame receiving process by the station node will be described. As shown in FIG. 16, when the station node receives the RPR frame (the RMAC frame) from the RPR ring, a source MAC address (SA) of the RMAC frame is checked (step S201), and it is judged whether the source MAC address is a self-device address or not (step S202).

At this time, in case the source MAC address is the self-device address (S202; Y), the frame is discarded (step S203), and the receiving process is finished. By contrast with this, in case the source MAC address is not the self-device address (S202; N), a destination MAC address of the RPR frame (RMAC frame) is checked (step S204), and it is judged whether the destination MAC address is the self-device address or not (step S205).

At this time, the processing proceeds to step S208 in case the destination MAC address is the self-device address (S205; Y), and proceeds to step S206 in case it is not (S205; N).

In step S206, it is judged whether the destination MAC address is a broadcast address or not, in case it is the broadcast address (S206; Y), the processing proceeds to step S209, while in case it is not (S206; N), the RMAC frame is sent to a next device (a neighboring node) (step S207), and the receiving process is terminated.

In step S208, the RMAC frame is captured in the device (the station node), and the processing advances to step S210.

In step S209, the RMAC frame is captured in the device (the station node) and transmitted to the next device (the neighboring node), and the processing proceeds to step S210.

In step S210, the packet type in the RPR header of the RMAC frame is checked, and the packet (the user data field) in the RMAC frame is transferred to the protocol processing unit corresponding to the packet type. Upon finishing step S210, the receiving process is terminated.

[Others]

The embodiment described above discloses the following inventions. The following inventions can be properly combined. Note that the invention can be applied to a single ring in addition to the dual rings on which the RPR protocol functions. For example, one of the dual rings is so set as not to work due to a failure, and so on. Alternatively, on the occasion of forwarding the received MAC frame to any one of the rings, only one-side ring is invariably selected. Thus, the invention can be applied to the single ring. It is obvious that the kind of implementation can be easily embodied by those skilled in the art.

According to the invention, it is possible to provide the RPR-network-related technology that eliminates the necessity for the flag for distinguishing and the ET indicating that the MAC address is added and the frame is encapsulated.

Further, according to the invention, it is feasible to provide the RPR-network-related technology including means by which only the bridge node on the ring receives the frame with its address unknown.

What is claimed is:

1. A resilient packet ring (RPR) network system in a RPR network, comprising:
   a plurality of station nodes terminating media access control (MAC) frames; and
   a plurality of bridge nodes forwarding MAC frames, in which both of the plurality of station nodes and the plurality of bridge nodes are located in one or more ringlets,
   wherein each of the station nodes, in the case of transmitting a MAC frame to other station node, transmits a RPR MAC frame in which a MAC address of the other station node is set as a destination MAC address, and transmits, in the case of transmitting a MAC frame to a station accommodated to a bridge node and located in the outside of the ringlets, a RPR MAC frame into which the MAC frame is encapsulated in such a state that the bridge node can capture the MAC frame,
   each of the bridge nodes, in the case of receiving, from a station accommodated to the bridge node itself and located in the outside of the ringlets, the MAC frame in which a MAC address of a station accommodated to other bridge node and located in the outside of the ringlets is set as a destination address, transmits a RPR MAC frame into which the MAC frame is encapsulated in such a state that the other bridge node can capture the RPR MAC frame, and, in the case of receiving, from a station accommodated to the bridge node itself, a MAC frame in which a MAC address of a station node is set as a destination MAC address, converts the MAC frame into a RPR MAC frame and transmits the RPR MAC frame,
   each of the station nodes captures the RPR MAC frame that the MAC frame is not encapsulated, and
   each of the bridge nodes captures the RPR MAC frame into which the MAC frame is encapsulated, and transmits the MAC frame within the captured RPR MAC frame to a station accommodated to the bridge node itself and located in the outside of the ringlets.

2. A RPR network system according to claim 1, wherein each of the station nodes and each of the bridge nodes have a table registered with the MAC addresses of all the station nodes and bridge nodes connected to the ringlets,
   each of the station nodes, in the case of transmitting a MAC frame, converts the MAC frame into a RPR MAC format and transmits the RPR MAC frame if a destination MAC address of the MAC frame is registered in the table, and transmits a RPR MAC frame into which the MAC frame is encapsulated if the destination MAC address is not registered in the table, and
   each of the bridge nodes, in the case of forwarding a MAC frame received from a station accommodated to the bridge node itself and located in the outside of the ringlets, transmits the MAC frame converted into a RPR MAC frame format if a destination MAC address of the MAC frame is registered in the table, and transmits a RPR MAC frame into which the MAC frame is encapsulated if the destination MAC address is not registered in the table.

3. A RPR network system according to claim 2, wherein each of the station nodes and each of the bridge nodes have a mapping table stored with correspondence between a MAC address of each bridge node and a MAC address of a station accommodated to each bridge node and located in the outside of the ringlets, and
   each of the station nodes and each of the bridge nodes, in the case of transmitting a RPR MAC frame into which a MAC frame is encapsulated, if a MAC address of a bridge node corresponding to a destination MAC address of the MAC frame is stored in the mapping table, set the MAC address of the bridge node for a destination MAC address of the RPR MAC frame.

4. A RPR network system according to claim 3, wherein each of the station nodes and each of the bridge nodes retain a multicast address that all the bridge nodes belong to a group of the multicast address, and
   each of the station nodes and each of the bridge nodes, in the case of transmitting a RPR MAC frame into which a MAC frame is encapsulated, if a MAC address of a bridge node corresponding to a destination MAC address of the MAC frame is not stored in the mapping table, set the multicast address for a destination MAC address of the RPR MAC frame.

5. A RPR network system according to claim 3, wherein each of the bridge nodes, in the case of transmitting a RPR MAC frame into which a MAC frame is encapsulated and in which a MAC address of a bridge node corresponding to a destination MAC address of the MAC frame is set for a destination MAC address of thereof, sets a MAC address of the bridge node itself for a source MAC address of the RPR MAC frame, and
   the station node and/or the bridge node and forwarding the RPR MAC frame into which the MAC frame transmitted from the bridge node is encapsulated, stores the mapping table with correspondence between a source MAC address of the RPR MAC frame and a source MAC address of the MAC frame within the RPR MAC frame.

6. A bridge node located, together with a plurality of station nodes terminating media access control (MAC) frames and another bridge node, in one or more ringlets constructing a resilient packet ring (RPR) network, comprising:
   a receiving unit operable to receive a MAC frame from a station located on outside of the ringlets;
   a determining unit operable to determine whether a destination MAC address of the MAC frame received by the receiving unit indicates a MAC address of another station accommodated to the other bridge node or a MAC address of one of the plurality of station nodes;
   a transmitting unit operable to transmit to the other bridge node an RPR MAC frame into which the MAC frame is encapsulated in such a state that the other node can capture the RPR MAC frame if the destination MAC address indicates the MAC address of the other station, and operable to transmit to the one of the plurality of station nodes an RPR MAC frame obtained by conversion of the MAC frame if the destination address indicates the MAC address of the one of the plurality of station nodes.

7. A bridge node according to claim 6, wherein the bridge node has a table registered with MAC addresses of all the station nodes and bridge nodes connected to the ringlets, and
   the bridge node, in the case of forwarding a MAC frame received from the station, converts the MAC frame into a RPR MAC frame and transmits the RPR MAC frame if a destination MAC address of the MAC frame is registered in the table, and transmits a RPR MAC frame into which the MAC frame is encapsulated if the destination MAC address of the MAC frame is not registered in the table.

8. A bridge node according to claim 7, wherein the bridge node further has a mapping table stored with correspondence between the MAC addresses of the bridge nodes and a MAC address of a station located in the outside of the ringlets and accommodated to the bridge nodes, and the bridge node, in the case of transmitting a RPR MAC frame into which a MAC frame is encapsulated, if a MAC address of a bridge node corresponding to a destination MAC address of the MAC frame is stored in the mapping table, sets the MAC address of the bridge node for a destination MAC address of the RPR MAC frame.

9. A bridge node according to claim 8, wherein the bridge node retains a multicast address that all the plurality of bridge nodes belong to a group of the multicast address, and the bridge node, in the case of transmitting a RPR MAC frame into which a MAC frame is encapsulated, if a MAC address of a bridge node corresponding to a destination MAC address of the MAC frame is not stored in the mapping table, sets the multicast address for a destination MAC address of the RPR MAC frame.

10. A bridge node according to claim 8, wherein the bridge node, in the case of forwarding a RPR MAC frame transmitted from other bridge node, wherein the RPR MAC frame has a encapsulated MAC frame, has a MAC address of a bridge node corresponding to a destination MAC address of the encapsulated MAC frame as a destination MAC address thereof, and has a MAC address of other bridge node as a source MAC address thereof, stores the mapping table with correspondence between the source MAC address of the RPR MAC frame and the source MAC address of the encapsulated MAC frame.

11. A station node located, together with a plurality of bridge nodes forwarding a media access control (MAC) frame and another staff on node, on one or more ringlets constructing a resilient packet ring (RPR) network, comprising:

a determining unit operable to determine, upon transmitting a MAC frame, whether a destination of the MAC frame is the other station node or a station located on outside of the ringlets and accommodated to one of the plurality of bridge nodes; and a transmitting unit operable to transmit to the other station node an RPR MAC frame obtained by conversion of the MAC frame and having a destination MAC address indicating the other station node if the destination is the other station node, and operable to transmit to the one of the plurality nodes an RPR MAC frame into which the MAC frame is encapsulated in such a state that the one of the plurality of bridge nodes can capture the RPR MAC frame if the destination is the station so that the one of the plurality of bridge nodes captures the RPR MAC frame to transmit to the other station the MAC frame in the RPR MAC frame.

12. A station node according to claim 11, wherein the station node has a table registered with MAC addresses of all the station nodes and bridge nodes connected to the ringlets, and the station node, in the case of transmitting a MAC frame, converts the MAC frame into a RPR MAC frame and transmits the RPR MAC frame if a destination MAC address of the MAC frame is registered in the table, and transmits a RPR MAC frame into which the MAC frame is encapsulated if the destination MAC address of the MAC frame is not registered in the table.

13. A station node according to claim 12, wherein the station node further has a mapping table stored with correspondence between a MAC address of each bridge node and a MAC address of a station accommodated to each bridge node and located in the outside of the ringlets, and the station node, in the case of transmitting a RPR MAC frame into which a MAC frame is encapsulated, if a MAC address of a bridge node corresponding to a destination MAC address of the MAC frame is stored in the mapping table, sets the MAC address of the bridge node for a destination MAC address of the RPR MAC frame.

14. A station node according to claim 13, wherein the station node retains a multicast address that all the bridge nodes belong to a group of the multicast address, and the station node, in the case of transmitting a RPR MAC frame into which a MAC frame is encapsulated, if a MAC address of a bridge node corresponding to a destination MAC address of the MAC frame, sets the multicast address for a destination MAC address of the RPR MAC frame.

15. A station node according to claim 13, wherein the station node, in the case of forwarding a RPR MAC frame transmitted from other bridge node, wherein the RPR MAC frame has a encapsulated MAC frame, has a MAC address of a bridge node corresponding to a destination MAC address of the MAC frame as a destination MAC address thereof, and has a MAC address of other bridge node as a source MAC address thereof, stores the mapping table with correspondence between the source MAC address of the RPR MAC frame and the source MAC address of the encapsulated MAC frame within the RPR MAC frame.

16. A resilient packet ring (RPR) card installed into a bridge node located, together with a plurality of station nodes terminating a media access control (MAC) frame and another bridge node, on one or more ringlets constructing a RPR network, comprising:

a receiving unit operable to receive a MAC frame from a station located on outside of the ringlets;

a determining operable to determine whether a destination MAC address of the MAC frame received by the receiving unit indicates a MAC address of another station accommodated to the other bridge node or a MAC address of one of the plurality of station nodes;

a transmitting unit operable to transmit to the other bridge node an RPR MAC frame into which the MAC frame is encapsulated in such a state that the other bridge node can capture the RPR MAC frame when the destination MAC address indicates the MAC address of the other station, and to transmit to the one of the plurality of station nodes an RPR MAC frame obtained by conversion of the MAC frame when the destination address indicates the MAC address of the one of the plurality of station nodes.

17. A RPR card according to claim 16, wherein the RPR card has a table registered with correspondence between MAC addresses of all the station nodes and bridge nodes connected to the ringlets, and the RPR card, in the case of forwarding a MAC frame received from the station, converts the MAC frame into a RPR MAC frame and transmits the RPR MAC frame if a destination MAC address of the MAC frame is registered in the table, and transmits a RPR MAC frame into which the MAC frame is encapsulated if the destination MAC address of the MAC frame is not registered in the table.

18. A RPR card according to claim 17, wherein the RPR card further has a mapping table stored with correspondence between a MAC address of each bridge node and a MAC address of a station located in the outside of the ringlets and accommodated to each bridge node, and the RPR card, in the case of transmitting a RPR MAC frame into which a MAC frame is encapsulated, if a MAC address of a bridge node corresponding to a destination MAC address of the MAC frame is stored in the mapping table, sets the MAC address of the bridge node for a destination MAC address of the RPR MAC frame.

19. A RPR card according to claim 18, wherein the RPR card retains a multicast address that all the bridge nodes on the ringlets belong to a group of the multicast address, and the RPR card, in the case of transmitting a RPR MAC frame into which a MAC frame is encapsulated, if a MAC address of a bridge node corresponding to a destination MAC address of the MAC frame is not stored in the mapping table, sets the multicast address for a destination MAC address of the RPR MAC frame.

20. A RPR card according to claim 18, wherein the RPR card, in the case of forwarding a RPR MAC frame transmitted from other bridge node, wherein the RPR MAC frame has a encapsulated MAC frame therein, has a MAC address of a bridge node corresponding to a destination MAC address of the MAC frame as a destination MAC address thereof, and has a MAC address of the other bridge node as a source MAC address thereof, stores the mapping table with correspondence between the source MAC address of the RPR MAC frame and a source MAC address of the encapsulated MAC frame within the RPR MAC frame.

21. A media access control (MAC) frame forwarding method for a bridge node located, together with a plurality of station nodes terminating MAC frames, in one or more ringlets constructing a resilient packet ring (RPR) network, said method comprising:

transmitting, in the case of receiving a MAC frame from a station, which is located in the outside of the ringlets, and in which a MAC address of other station, which is located in the outside of the ringlets and is accommodated to other bridge node connected to the ringlets, is set for a destination MAC address, a RPR MAC frame into which the MAC frame is encapsulated in such a state that the other bridge node can capture the RPR MAC frame; and converting, in the case of receiving a MAC frame from the station in which a MAC address of a station node is set for a destination MAC address, the MAC frame into a RPR MAC frame and transmitting the RPR MAC frame.

22. A MAC frame forwarding method for a resilient packet ring (RPR) card installed into a bridge node located, together with a plurality of station nodes terminating media access control (MAC) frames, in one or more ringlets constructing a RPR network, said method comprising:

transmitting, in the case of receiving a MAC frame from a station, which is located in the outside of the ringlets, and in which a MAC address of other station, which is located in the outside of the ringlets and is accommodated to other bridge node connected to the ringlets, is set for a destination MAC address thereof, a RPR MAC frame into which the MAC frame is encapsulated in such a state that the other bridge node can capture the RPR MAC frame, and converting, in the case of receiving a MAC frame from the station in which a MAC address of a station node is set for a destination MAC address, the MAC frame into a RPR MAC frame and transmitting the RPR MAC frame.

* * * * *

UNITED STATES PATENT AND TRADEMARK OFFICE
CERTIFICATE OF CORRECTION

PATENT NO. : 7,436,784 B2
APPLICATION NO. : 10/773769
DATED : October 14, 2008
INVENTOR(S) : Masanori Hashimoto It is certified that error appears in the above-identified patent and that said Letters Patent is hereby corrected as shown below:

Column 26, line 43: "that the other node can" should be changed to --that the other bridge node can--.

Column 27, line 29: "and another staff on node," should be changed to --and another station node,--; line 42, "plurality nodes an RPR MAC" should be changed to --plurality of bridge nodes an RPR MAC--.

Column 28, line 31: "a determining operable to" should be changed to --a determining unit operable to--.

Signed and Sealed this

Thirty-first Day of March, 2009

JOHN DOLL
*Acting Director of the United States Patent and Trademark Office*